United States Patent
Fukami et al.

(10) Patent No.: US 8,450,867 B2
(45) Date of Patent: *May 28, 2013

(54) WIND TURBINE GENERATOR AND ITS CONTROL METHOD

(75) Inventors: Koji Fukami, Nagasaki (JP); Atsushi Matsuo, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 578 days.

This patent is subject to a terminal disclaimer.

(21) Appl. No.: 12/674,211

(22) PCT Filed: Apr. 30, 2009

(86) PCT No.: PCT/JP2009/058790
§ 371 (c)(1),
(2), (4) Date: Mar. 26, 2010

(87) PCT Pub. No.: WO2010/050260
PCT Pub. Date: May 6, 2010

(65) Prior Publication Data
US 2011/0127772 A1 Jun. 2, 2011

(30) Foreign Application Priority Data
Oct. 29, 2008 (JP) .................. 2008-278643

(51) Int. Cl.
*F03D 9/00* (2006.01)
(52) U.S. Cl.
USPC ............................................ 290/44; 290/55
(58) Field of Classification Search
USPC .................. 290/44, 55; 416/9, 31, 32, 37, 41, 416/170 R
See application file for complete search history.

(56) References Cited

U.S. PATENT DOCUMENTS

| 6,945,752 | B1 | 9/2005 | Wobben |
| 6,946,751 | B2 * | 9/2005 | Yoshida et al. ................. 290/44 |
| 8,043,055 | B2 * | 10/2011 | Matsuo et al. .................... 416/9 |
| 2007/0035135 | A1 | 2/2007 | Yoshida |
| 2007/0212209 | A1 | 9/2007 | Borgen |
| 2010/0080702 | A1 | 4/2010 | Matsuo et al. |

FOREIGN PATENT DOCUMENTS

| CN | 101117945 A | 2/2008 |
| CN | 101122279 A | 2/2008 |
| EP | 2143939 A1 | 1/2010 |
| JP | 2002530590 A | 9/2002 |
| JP | 2004285858 A | 10/2004 |

(Continued)

OTHER PUBLICATIONS

Australian Office Action for Australian Patent Application 2009308570, dated Mar. 21, 2012.

(Continued)

*Primary Examiner* — Tho D Ta
(74) *Attorney, Agent, or Firm* — Kanesaka Berner & Partners, LLP

(57) ABSTRACT

There is provided a yaw control technique for a wind turbine generator that can decrease the magnitude of the wind direction deviation even though the wind direction changes gradually over an extended period of time while suppressing an increase in the number of yaw rotations. Further, there is provided a yaw control technique for a wind turbine generator that can improve the efficiency of a wind turbine generator by performing yaw rotation at an appropriate timing through early detection of transitional changes in the wind direction.

13 Claims, 16 Drawing Sheets

FOREIGN PATENT DOCUMENTS

| | | |
|---|---|---|
| JP | 2005113899 A | 4/2005 |
| JP | 2008-261245 A | 10/2008 |
| KR | 2003 0071855 A | 9/2003 |
| KR | 10-2004-0011528 A | 2/2005 |
| KR | 10-0608079 B1 | 8/2006 |
| WO | 2005090781 A1 | 9/2005 |
| WO | 2005108784 A1 | 11/2005 |
| WO | 2008/126659 A1 | 10/2008 |

OTHER PUBLICATIONS

International Search Report of Application No. PCT/JP2009/058790 mailed Aug. 11, 2009.

International Preliminary Report on Patentability issued Jun. 7, 2011, w/English Translation.

Office Action issued to corresponding Chinese Application No. 200980109583.9 (Chinese Language Version).

Office Action issued to corresponding Chinese Application No. 200980109583.9 (English Language Version).

Notice of Allowance (Decision to Grant) issued in corresponding Korean Patent Application No. 2010-7020741, issued on Aug. 27, 2012 (Korean Language Version).

Notice of Allowance (Decision to Grant) issued in corresponding Korean Patent Application No. 2010-7020741, issued on Aug. 27, 2012 (English Language Version).

* cited by examiner

Fig. 7 (a1)
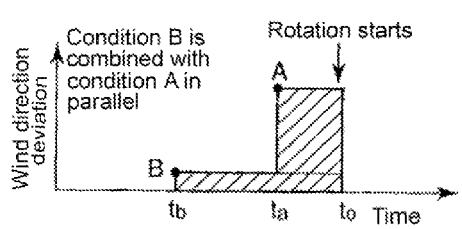
Fig. 7 (a2)
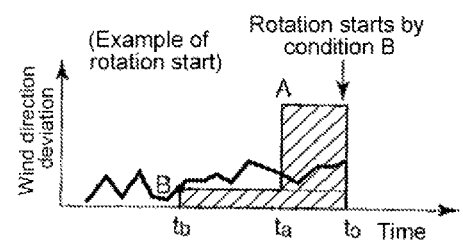
Fig. 7 (b1)
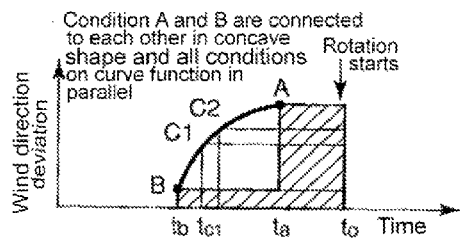
Fig. 7 (b2)
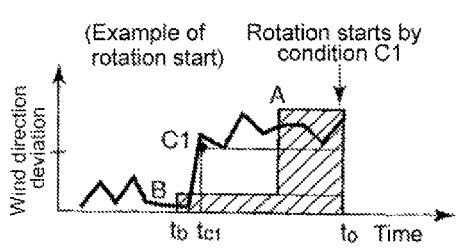
Fig. 7 (c1)
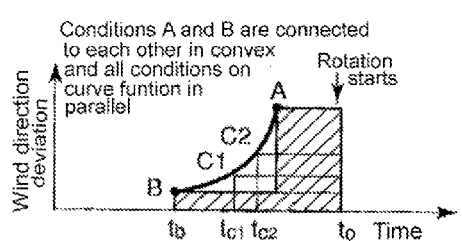
Fig. 7 (c2)
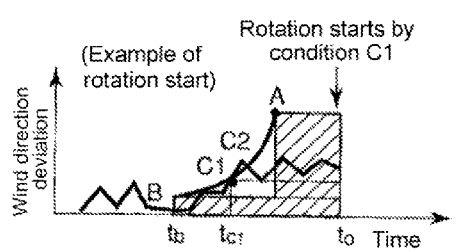

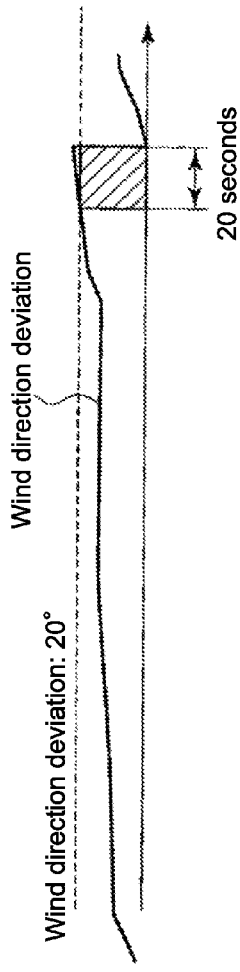
Fig. 12 (a) Related Art
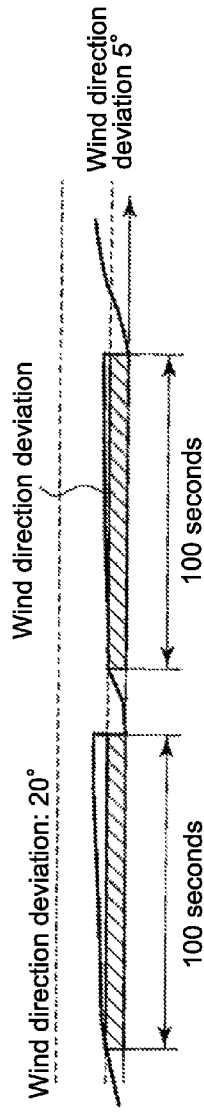
Fig. 12 (b) When wind direction having small degree of turbulence is changed in predetermined direction
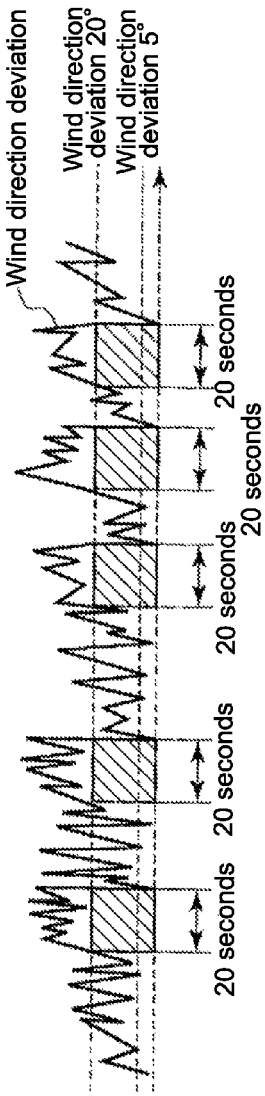
Fig. 12 (c) When wind direction having large degree of turbulence is changed in predetermined direction

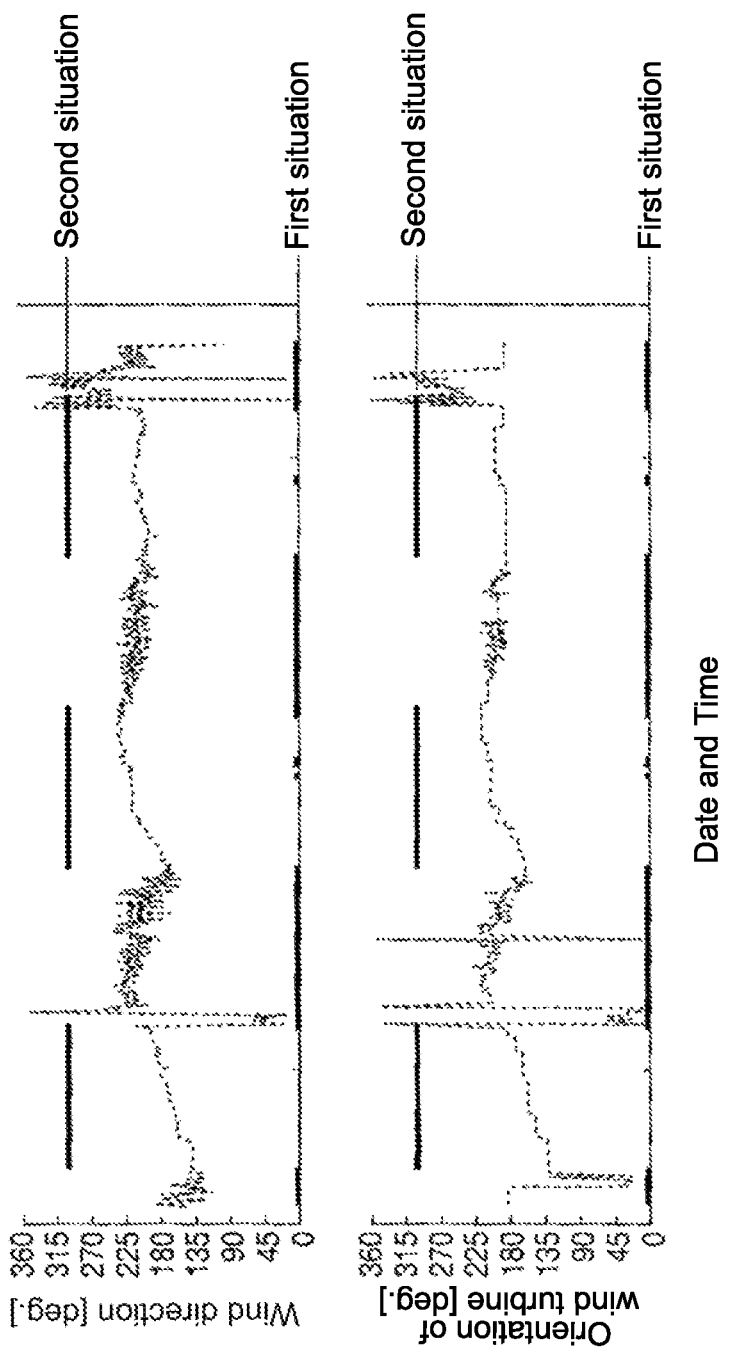

Intermediate embodiment

Fig. 16 (a) Related art
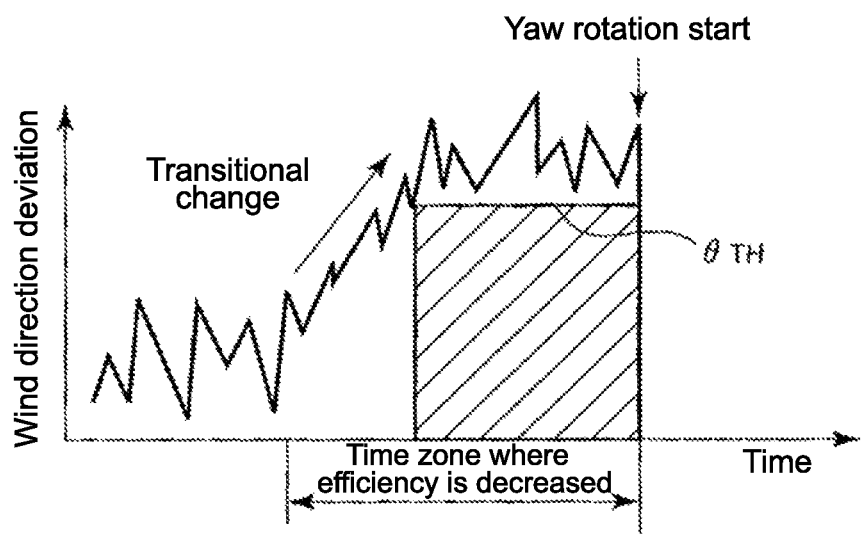
Fig. 16 (b) Intermediate embodiment
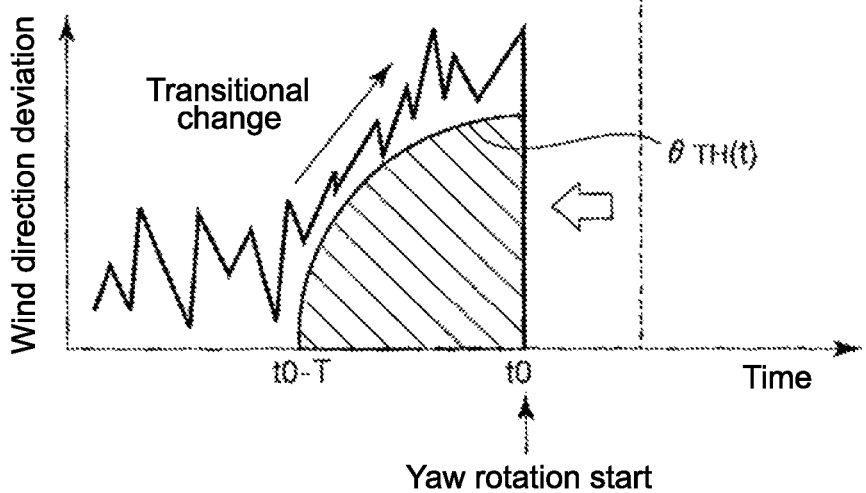

WIND TURBINE GENERATOR AND ITS CONTROL METHOD

RELATED APPLICATIONS

The present application is based on, and claims priority from, International Application Number PCT/JP2009/058790, filed Apr. 30, 2009, the disclosure of which is hereby incorporated by reference herein in its entirety.

BACKGROUND OF THE INVENTION

1. Technical Field

The present invention relates to a wind turbine generator and a method of controlling the wind turbine generator, and more particularly, to the yaw control of a wind turbine generator.

2. Description of the Related Art/Background Art

One important control for improving the efficiency of a wind turbine generator is yaw control for controlling the direction of the wind turbine rotor so that the direction of the wind turbine rotor corresponds to the wind direction. When the wind turbine rotor faces into the wind, the wind turbine generator achieves maximum efficiency. Accordingly, the direction of the wind turbine rotor needs to be controlled by performing yaw rotation of a nacelle, in which the wind turbine rotor is mounted, in accordance with a wind direction. There have been various challenges for a yaw rotating mechanism or a yaw control technique. For example, Japanese Patent Application Laid-Open No. 2004-285858 discloses a technique that detects the wind direction and wind power by a laser-type wind vane/anemometer and performs yaw control on the basis of the detected wind direction and wind speed. Further, Japanese Patent Application Laid-Open No. 2005-113899 discloses the configuration of a drive mechanism for performing the yaw rotation of the nacelle.

One of the important aspects of yaw control for a wind turbine generator is to reduce the number of yaw rotations of the nacelle. The nacelle is heavy and, for this reason, if the number of yaw rotations of the nacelle is large, the mechanical load applied to the rotating mechanism for rotating the nacelle or the braking mechanism for stopping nacelle rotation increases. As a result, mechanical wear on these mechanisms increases. It is preferable that the number of yaw rotations be minimized in order to reduce wear on the rotating mechanism or the braking mechanism.

The control logic used to meet these demands for the most common yaw control is a control logic performing yaw rotation of the nacelle so that deviation from the wind direction becomes zero (that is, the orientation of the wind turbine corresponds to the newest wind direction) when a state where the absolute value of the deviation (the wind direction deviation) between the orientation of a wind turbine (that is, the direction of a wind turbine rotor) and the actual wind direction is larger than a predetermined threshold continues for a predetermined duration (for example, 20 seconds) as shown in FIG. 18. Unless the absolute value of the wind direction deviation exceeds a threshold, yaw rotation is not performed in this control logic. Accordingly, it may be possible to reduce the number of yaw rotations by appropriately setting the threshold.

As shown in FIG. 19, one problem with this control logic is that, in a situation where the wind direction changes gradually over a long time (typically, several hours), the magnitude of the wind direction deviation is not reduced on average. In general, the wind at a certain location has high degree of turbulence during the day and the wind direction changes at random, but it is often the case that at night the wind direction does not randomly change. In other words, the wind situation often changes at night so that the wind direction changes over an extended period of time. According to the above-mentioned control logic, the magnitude in the wind direction deviation approaches zero on average in situations where the degree of turbulence is high and the wind direction changes at random. However, if the wind direction changes gradually over a long time (typically, several hours) as shown in FIG. 19 (A of FIG. 19), the wind direction deviation becomes zero only momentarily (C of FIG. 19) in the above-mentioned control logic even though the yaw rotation is repeated (B of FIG. 19). Accordingly, the average magnitude of the wind direction deviation is not reduced. This is not preferable for improving the efficiency of the wind turbine generator.

SUMMARY OF THE INVENTION

Accordingly, an overall object of the invention is to improve an efficiency of a wind turbine generator, specifically, an object of the invention is to achieve at least one of the following two tasks.

First task: there is provided a yaw control technique for a wind turbine generator that can reduce the magnitude of the wind direction deviation even though the wind direction changes gradually over a long time while an increase in the number of yaw rotations is suppressed.

Second task: there is provided a yaw control technique for a wind turbine generator that can improve the efficiency of the wind turbine generator by performing yaw rotations at an appropriate timing through early detection of transitional changes in the wind direction.

In order to achieve the above-mentioned object, the invention includes means to be described below. Numbers and reference numerals used in [Best Mode for Carrying out the Invention] are given to the means in order to clarify a correspondence relationship between the description of [Claims] and the description of [Best Mode for Carrying out the Invention]. However, the given numbers and reference numerals are not used to limit the scope of the invention as described in [Claims].

A wind turbine generator includes a nacelle 3 in which a wind turbine rotor 7 is mounted, a rotating mechanism 4 that performs yaw rotation of the nacelle 3, a wind direction measuring means 10 that measures a wind direction, and a controller 21 that controls the rotating mechanism 4. The controller 21 calculates the wind direction deviation of the direction of the wind turbine rotor 7 and the wind direction measured by the wind direction measuring means 10, and performs yaw rotation of the nacelle by the rotating mechanism when any one of the following conditions (1) and (2) is satisfied. The conditions (1) and (2) include (1) a state where the absolute value of the wind direction deviation is not less than a first threshold (or a state where the absolute value of the wind direction deviation exceeds a first threshold) continues for a predetermined first duration, and (2) a state where the absolute value of the wind direction deviation is not less than a second threshold larger than the first threshold (or a state where the absolute value of the wind direction deviation exceeds a second threshold) continues for a second duration shorter than the first duration. Assuming that the current time is denoted by $t_0$ and T denotes a predetermined value, yaw rotation of the nacelle 3 is stopped if an average of the wind direction between time $t_0-T$ and time $t_0$ corresponds to the direction of the wind turbine rotor 7.

The stop position of the yaw rotation is determined in this way by an average of the wind direction at a predetermined time T, so that it may be possible to stop yaw rotation of the nacelle 3 at an appropriate position, without stopping the yaw rotation by a momentary change in the wind direction. Accordingly, it may be possible to further reduce the wind direction deviation after stopping the yaw rotation than in the related art. Further, time elapsed until the next yaw rotation starts is lengthened by reducing the wind direction deviation after stopping the yaw rotation, so that it may be possible to decrease the number of yaw rotations. Furthermore, the number of the yaw rotations is suppressed and control performance is improved.

Further, a wind turbine generator includes a nacelle 3 in which a wind turbine rotor 7 is mounted, a rotating mechanism 4 that performs yaw rotation of the nacelle 3, a wind direction measuring means 10 that measures a wind direction, and a controller 21 that controls the rotating mechanism 4. The controller 21 calculates the wind direction deviation from the direction of the wind turbine rotor 7 and the wind direction measured by the wind direction measuring means 10, and performs yaw rotation of the nacelle 3 by the rotating mechanism when any one of the following conditions (1) and (2) is satisfied. The conditions (1) and (2) includes (1) a state where the absolute value of the wind direction deviation is not less than a first threshold (or a state where the absolute value of the wind direction deviation exceeds a first threshold) continues for a predetermined first duration, and (2) a state where the absolute value of the wind direction deviation is not less than a second threshold larger than the first threshold (or a state where the absolute value of the wind direction deviation exceeds a second threshold) continues for a second duration shorter than the first duration. Yaw rotation of the nacelle 3 is performed by an angle which corresponds to the first or second threshold corresponding to at least one of conditions (1) and (2) satisfied at the time of the yaw rotation.

In this way, yaw rotation of the nacelle 3 is performed by an angle, which corresponds to the first or second threshold corresponding to at least one of conditions (1) and (2) satisfied at the time of the yaw rotation. Accordingly, it may be possible to stop yaw rotation of the nacelle 3 at an appropriate position, without stopping the yaw rotation by a momentary change in the wind direction. Therefore, time elapsed until the next yaw rotation starts is lengthened by reducing the wind direction deviation after stopping the yaw rotation, so that it may be possible to suppress the number of yaw rotations. Furthermore, this control is effective when the degree of wind turbulence is particularly small.

Moreover, the controller 21 rotates the nacelle 3 by an angle corresponding to the first or second threshold, determines whether a sign of the wind direction deviation becomes opposite to a sign of the wind direction deviation before the yaw rotation, stops the yaw rotation if the sign of the wind direction deviation becomes opposite to the sign of the wind direction deviation before the yaw rotation, and continues the yaw rotation until the wind direction deviation becomes zero if the sign of the wind direction deviation does not become opposite to the sign of the wind direction deviation before the yaw rotation.

The controller rotates the nacelle by an angle corresponding to the first or second threshold, determines whether a sign of the difference between the direction of the wind turbine rotor and an average of the wind direction between time $t_0 - T$ and time $t_0$ becomes opposite to a sign of the difference before the yaw rotation assuming that the current time is denoted by $t_0$ and T denotes a predetermined value, stops the yaw rotation if the sign of the difference becomes opposite to the sign of the deviation before the yaw rotation, and continues the yaw rotation until a difference between the average of the wind direction and the direction of the wind turbine rotor becomes zero if the sign of the wind direction deviation does not become opposite to the sign of the wind direction deviation before the yaw rotation.

Accordingly, it may be possible to stop the yaw rotation at a more appropriate position.

A wind turbine generator includes a nacelle 3 in which a wind turbine rotor 7 is mounted, a rotating mechanism 4 that performs yaw rotation of the nacelle 3, a wind direction measuring means 10 that measures a wind direction, and a controller 21 that controls the rotating mechanism 4. The controller (a) calculates the wind direction deviation from the direction of the wind turbine rotor 7 and the wind direction measured by the wind direction measuring means 10, (b) determines which situation of a first situation where the wind direction is changing randomly and a second situation where the wind direction changes gradually the current wind situation corresponds to, (c) determines that the current wind situation corresponds to the second situation, rotates the nacelle 3 by an angle corresponding to a first threshold when a state where the absolute value of the wind direction deviation is not less than a predetermined first threshold (or a state where the absolute value of the wind direction deviation exceeds the first threshold) continues for a predetermined first duration, determines whether a sign of the wind direction deviation becomes opposite to a sign of the wind direction deviation before the yaw rotation, stops the yaw rotation if the sign of the wind direction deviation becomes opposite to the sign of the wind direction deviation before the yaw rotation, and continues the yaw rotation until the wind direction deviation becomes zero if the sign of the wind direction deviation does not become opposite to the sign of the wind direction deviation before the yaw rotation, and (d) determines that the current wind situation corresponds to the first situation, and performs yaw rotation of the nacelle 3 so that an average of the wind direction between time $t_0 - T$ and time $t_0$ corresponds to the direction of the wind turbine rotor 7 assuming that the current time is denoted by $t_0$ and T denotes a predetermined value, when a state where the absolute value of the wind direction deviation is not less than a second threshold larger than the first threshold (or a state where the absolute value of the wind direction deviation exceeds a second threshold) continues for a second duration shorter than the first duration.

Accordingly, since it may be possible to perform the stop control of the yaw rotation in accordance with the current wind situation, control performance is improved.

Further, a wind turbine generator includes a nacelle 3 in which a wind turbine rotor 7 is mounted, a rotating mechanism 4 that performs yaw rotation of the nacelle 3, a wind direction measuring means 10 that measures a wind direction, and a controller 21 that controls the rotating mechanism 4. The controller 21 calculates the wind direction deviation from the direction of the wind turbine rotor 7 and the wind direction measured by the wind direction measuring means 10, and performs yaw rotation of the nacelle 3 when the wind direction deviation satisfies a predetermined condition about all of time t satisfying "$t_s \leq t \leq t_0$" assuming that the current time is denoted by $t_0$, $T_1$ denotes a predetermined value, and time satisfying "$t_0 - T_1 \leq t_s \leq t_0$" is denoted by $t_s$.

The predetermined condition is $|\Delta\theta(t)| \geq \theta_{TH}(t_s)$.

Meanwhile, $|\Delta\theta(t)|$ denotes the absolute value of the wind direction deviation at each time t, $\theta_{TH}(t)$ denotes a function that broadly uniformly increases in the range of "$t_0 - T_1 \leq t \leq t_0$", and a derived function $d\theta_{TH}(t)/dt$ of $\theta_{TH}(t)$ with respect to time broadly uniformly increases in the range of "$t_0 - T_1 \leq t \leq t_0$" except for time t where a derived function cannot be defined.

When a function $\theta_{TH}(t)$ is prepared in this way and the predetermined condition is satisfied, the condition of the yaw rotation is flexibly set by performing yaw rotation of the nacelle 3. Accordingly, it may be possible to detect a transitional change in the wind direction early, and control performance is improved.

Furthermore, a wind turbine generator includes a nacelle 3 in which a wind turbine rotor 7 is mounted, a rotating mechanism 4 that performs yaw rotation of the nacelle 3, a wind direction measuring means 10 that measures a wind direction, and a controller 21 that controls the rotating mechanism 4. The controller (a) calculates the wind direction deviation from the direction of the wind turbine rotor 7 and the wind direction measured by the wind direction measuring means 10, (b) determines which situation of a first situation where the wind direction changes at random and a second situation where the wind direction is gradually changed the current wind situation corresponds to, and (c) performs yaw rotation of the nacelle 3 when the wind direction deviation satisfies a predetermined condition about all of time t satisfying "$t_s \leq t \leq t_0$" assuming that the current time is denoted by $t_0$, $T_1$ denotes a predetermined value, and time satisfying "$t_0 - T_1 \leq t_s \leq t_0$" is denoted by $t_s$.

The predetermined condition is $|\Delta\theta(t)| \geq \theta_{TH1}(t_s)$ if the current wind situation corresponds to the first situation.

The predetermined condition is $|\Delta\theta(t)| \geq \theta_{TH2}(t_s)$ if the current wind situation corresponds to the second situation.

Meanwhile, $|\Delta\theta(t)|$ denotes the absolute value of the wind direction deviation at each time t, $\theta_{TH1}(t)$ denotes a function that broadly uniformly increases in the range of "$t_0 - T_1 \leq t \leq t_0$", and a derived function $d\theta_{TH1}(t)/dt$ of $\theta_{TH1}(t)$ with respect to time broadly uniformly increases in the range of "$t_0 - T_1 \leq t \leq t_0$" except for time t where a derived function cannot be defined, $\theta_{TH2}(t)$ denotes a function that broadly uniformly decreases in the range of "$t_0 - T_1 \leq t \leq t_0$", and a derived function $d\theta_{TH2}(t)/dt$ of $\theta_{TH2}(t)$ with respect to time broadly uniformly increases in the range of "$t_0 - T_1 \leq t \leq t_0$" except for time t where a derived function cannot be defined.

Accordingly, since it may be possible to perform the stop control of the yaw rotation in accordance with the current wind situation, control performance is improved.

In addition, assuming that the current time is denoted by $t_0$ and T denotes a predetermined value, the controller stops the yaw rotation of the nacelle if an average of the wind direction between time $t_0 - T$ and time $t_0$ corresponds to the direction of the wind turbine rotor.

Further, the controller rotates the nacelle by an angle corresponding to $\theta_{TH1}(t_s)$ or $\theta_{TH2}(t_s)$, determines whether a sign of the wind direction deviation becomes opposite to a sign of the wind direction deviation before yaw rotation, stops the yaw rotation if the sign of the wind direction deviation becomes opposite to the sign of the wind direction deviation before the yaw rotation, and continues the yaw rotation until the wind direction deviation becomes zero if the sign of the wind direction deviation does not become opposite to the sign of the wind direction deviation before the yaw rotation.

Furthermore, the controller measures the number of yaw rotations that is performed between the current time and a predetermined time, eases the rotation conditions if the number of yaw rotations is smaller than a predetermined number of rotations, and tightens the rotation conditions if the number of rotations is larger than a predetermined number of rotations.

Accordingly, the upper limit of a predetermined frequency of yaw rotations is maintained, and performance of the control for reducing the wind direction deviation is improved.

According to the invention, it may be possible to improve the efficiency of the wind turbine generator.

More specifically, according to the invention, it may be possible to provide a yaw control technique for a wind turbine generator that can reduce the magnitude of the wind direction deviation even though the wind direction changes gradually over a long time and can suppress an increase in the number of yaw rotations.

Further, according to another embodiment of the invention, it may be possible to improve the efficiency of the wind turbine generator by performing yaw rotations at an appropriate timing through the early detection of transitional changes in the wind direction.

BRIEF DESCRIPTION OF THE DRAWINGS

FIG. 7 shows graphs showing control logics of Examples 1 to 4, FIG. 7(a) shows graphs showing control logics used in Examples 1 to 3, and FIGS. 7(b) and 7(c) show graphs showing a control logic of Example 4.

FIG. 12 shows graphs showing the change of the wind direction deviation that is caused by a control logic in the related art, and the change of the wind direction deviation that is caused by a control logic of a first intermediate embodiment.

FIG. 13 shows graphs showing an example of the determination of "a situation where the wind direction changes at random so that the degree of turbulence is large" and "a situation where the wind direction changes gradually over a long time".

FIG. 16 shows graphs showing the start timing of the yaw rotation in the control logic in the related art and the start timing of the yaw rotation in a control logic of a third intermediate embodiment.

DETAILED DESCRIPTION OF THE INVENTION

Preferred examples of the invention will be described in detail below with reference to drawings. However, unless being particularly described, the dimensions, materials, and shape of components described in these examples, and the relative disposition thereof do not limit the scope of the invention and are merely illustrative.

Figure 9:
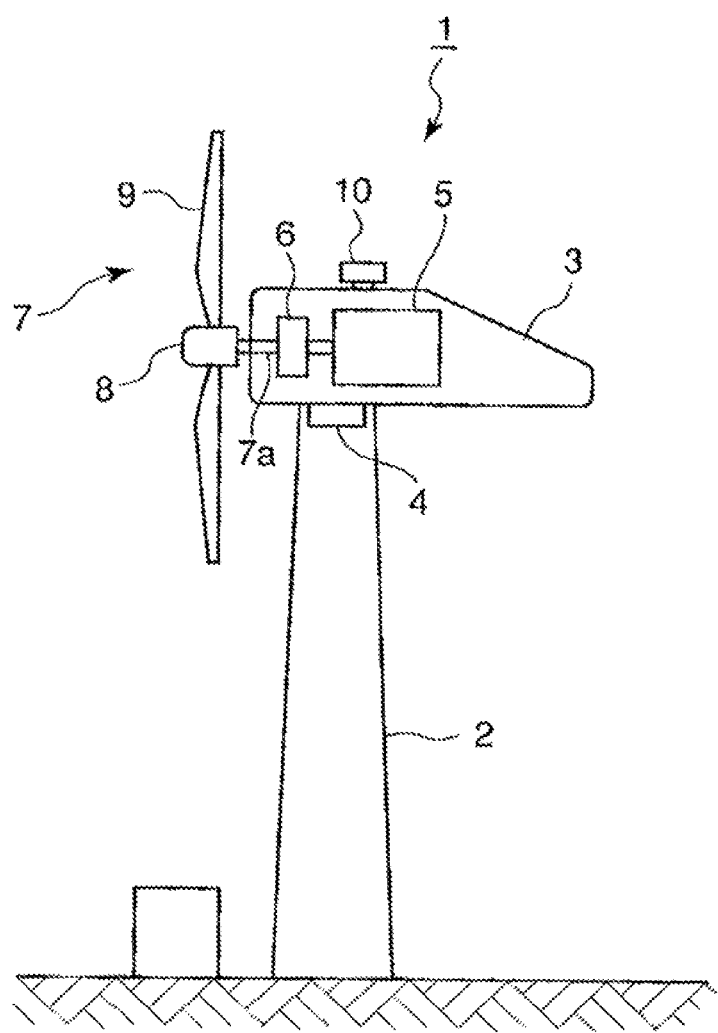
FIG. 9 is a view showing the configuration of a wind turbine generator according to an embodiment of the invention.

FIG. 9 is a side view showing the configuration of a wind turbine generator 1 according to the invention. The wind turbine generator 1 includes a tower 2 and a nacelle 3 that is provided at the upper end of the tower 2. The nacelle 3 is rotatable in a yaw direction, and is directed to a desired direction by a nacelle rotating mechanism 4. The nacelle 3 is provided with a wound-rotor induction generator 5 and a gear 6. A rotor of the wound-rotor induction generator 5 is coupled with a rotation shaft 7a of a wind turbine rotor 7 through a gear 6. The wind turbine rotor 7 includes a hub 8 that is connected to the rotation shaft 7a, and blades 9 that are fixed to the hub 8. The nacelle 3 is further provided with a wind vane/anemometer 10 that measures wind speed and a wind direction.

Figure 10:
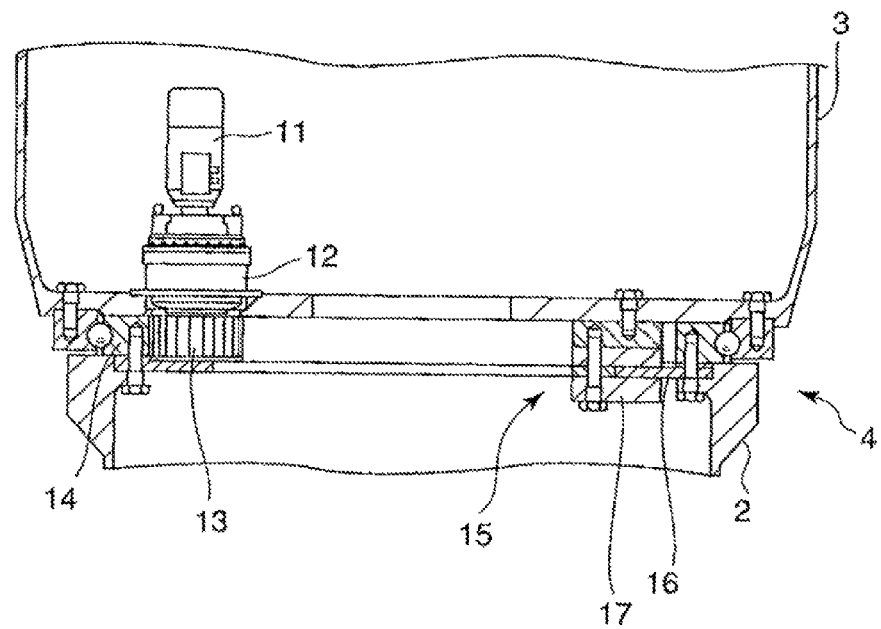
FIG. 10 is a cross-sectional view showing the configuration of a nacelle rotating mechanism of the embodiment of the invention.

FIG. 10 is a cross-sectional view showing an example of the configuration of the nacelle rotating mechanism 4. The nacelle rotating mechanism 4 includes a yaw motor 11, a decelerator 12, a pinion 13, an internal gear 14, a yaw braking mechanism 15, and a brake disc 16. The yaw motor 11, the decelerator 12, the pinion 13, and the yaw braking mechanism 15 are mounted on the nacelle 3, and move together with the nacelle 3. Meanwhile, the internal gear 14 and the brake disc 16 are fixed to the tower 2. A rotor of the yaw motor 11 is mechanically connected to the pinion 13 through the decelerator 12, and the pinion 13 and the internal gear 14 are engaged with each other. When current is supplied to the yaw motor 11, the pinion 13 rotates, so that yaw rotation of the nacelle 3 is performed. Yaw rotation of the nacelle 3 is braked by the braking mechanism 15. When brake shoes 17 of the yaw braking mechanism 15 clamp the brake disc 16, yaw rotation of the nacelle 3 is braked or stopped.

Figure 11:
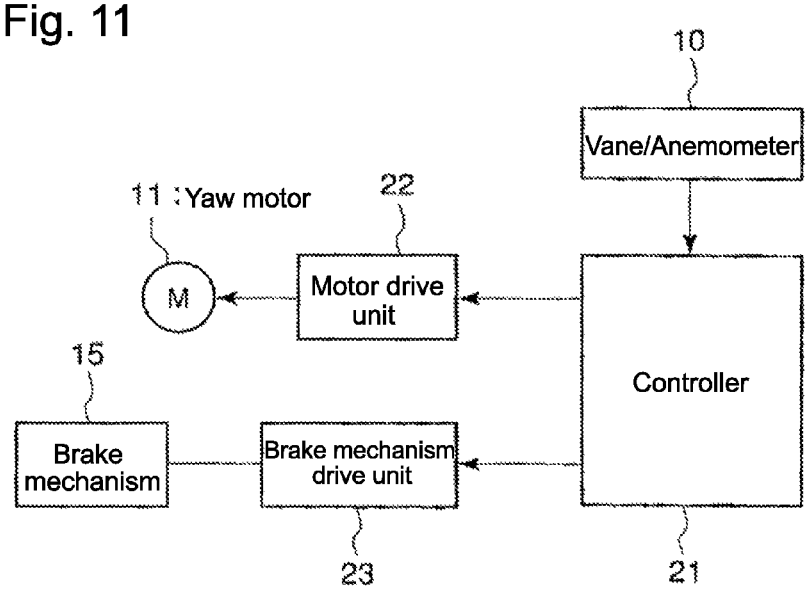
FIG. 11 is a block diagram showing the configuration of a yaw control system of a first embodiment of the invention.

FIG. 11 is a block diagram showing an example of the configuration of a control system for yaw control. In this embodiment, a yaw control system includes a controller 21, a motor drive unit 22, and a braking mechanism drive unit 23. The motor drive unit 22 supplies driving power to the yaw motor 11 in accordance with a control signal sent from the controller 21. The braking mechanism drive unit 23 makes the brake shoes 17 of the braking mechanism 15 clamp the brake disc 16 in accordance with a control signal sent from the controller 21. The controller 21 decides a desired direction of the wind turbine rotor 7 from the wind speed and the wind direction that are measured by the wind vane/anemometer 10, and performs yaw rotation of the nacelle 3 by operating the yaw motor 11 so that the wind turbine rotor 7 is directed to a desired direction. Further, if the wind turbine rotor 7 is directed to a desired direction by the yaw rotation, the controller 21 brakes the yaw rotation by operating the braking mechanism 15.

First Intermediate Embodiment

The yaw control according to a first intermediate embodiment, which is obtained by modifying the yaw control of the wind turbine generator in the related art having been described with reference to FIG. 18, will be described below. In the first intermediate embodiment, the yaw control is performed in response to the wind direction that is measured by the wind vane/anemometer 10. More specifically, the controller 21 performs the yaw control as follows:

The wind vane/anemometer 10 measures a wind direction, which corresponds to each time, at predetermined sampling intervals, and supplies wind direction data, which represent the wind direction corresponding to each time, to the controller 21. In the wind direction data, the wind direction is defined as an angle that is formed by a predetermined reference direction.

The controller 21 generates wind direction data for control, which are actually used for yaw control, by performing a low-pass filtering of the measured wind direction data (most simply, by averaging several wind direction data that are temporally adjacent), and calculates the difference between the orientation of the wind turbine and the wind direction, which is represented in the wind direction data for control, as a wind direction deviation. In the first intermediate embodiment, the orientation of the wind turbine is represented as an angle that is formed between a predetermined reference direction and the direction of the rotation shaft 7a of the wind turbine rotor 7. The wind direction deviation is a datum that has one of a positive value, a negative value, or zero. The value, which is obtained by subtracting the angle of the orientation of the wind turbine from the wind direction represented in the wind direction data for control, is defined as a wind direction deviation in the first intermediate embodiment and embodiments to be described below.

Further, the controller 21 performs yaw rotation of the nacelle 3 by controlling the motor drive unit 22 and the braking mechanism drive unit 23 in response to the calculated wind direction deviation. If satisfying at least one of the following two conditions in the first intermediate embodiment, the controller 21 performs yaw rotation so that the wind direction deviation becomes zero (that is, in a direction that is indicated by the newest wind direction data for control).

(1) A state where the absolute value of the wind direction deviation is not less than a threshold $\theta_{TH1}$ (or exceeds $\theta_{TH1}$) continues for $T_1$ seconds.

(2) A state where the absolute value of the wind direction deviation is not less than a threshold $\theta_{TH2}$ ($>\theta_{TH1}$) (or exceeds $\theta_{TH2}$) continues for $T_2$ ($<T_1$) seconds.

It should be noted that Condition (1) mainly contributes to yaw control in a situation where the wind direction changes at random so that the degree of turbulence is large and Condition (2) mainly contributes to yaw control in a situation where the wind direction changes gradually over a long time. Since the magnitude of the average wind direction deviation is reduced without increasing the number of yaw rotations as described below, the control logic is effective.

Figure 18:
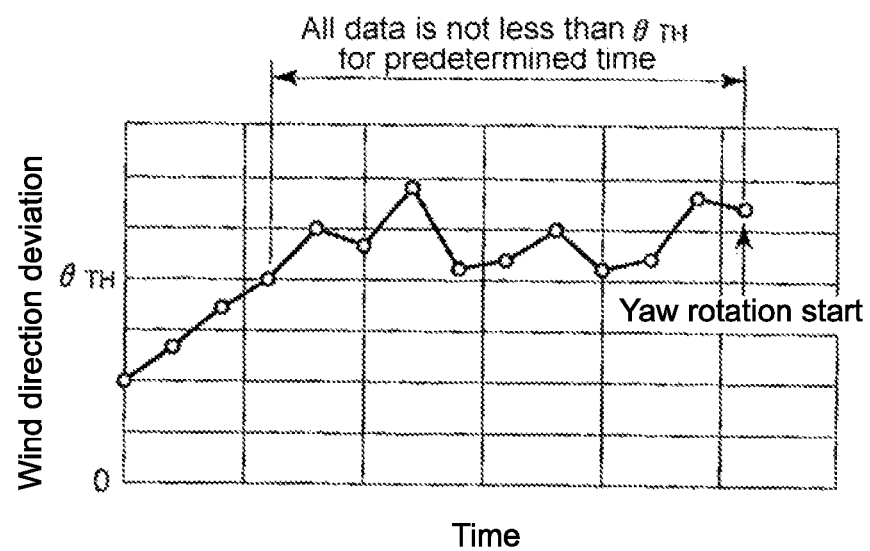
FIG. 18 is a graph showing the control logic in the related art.
Figure 19:
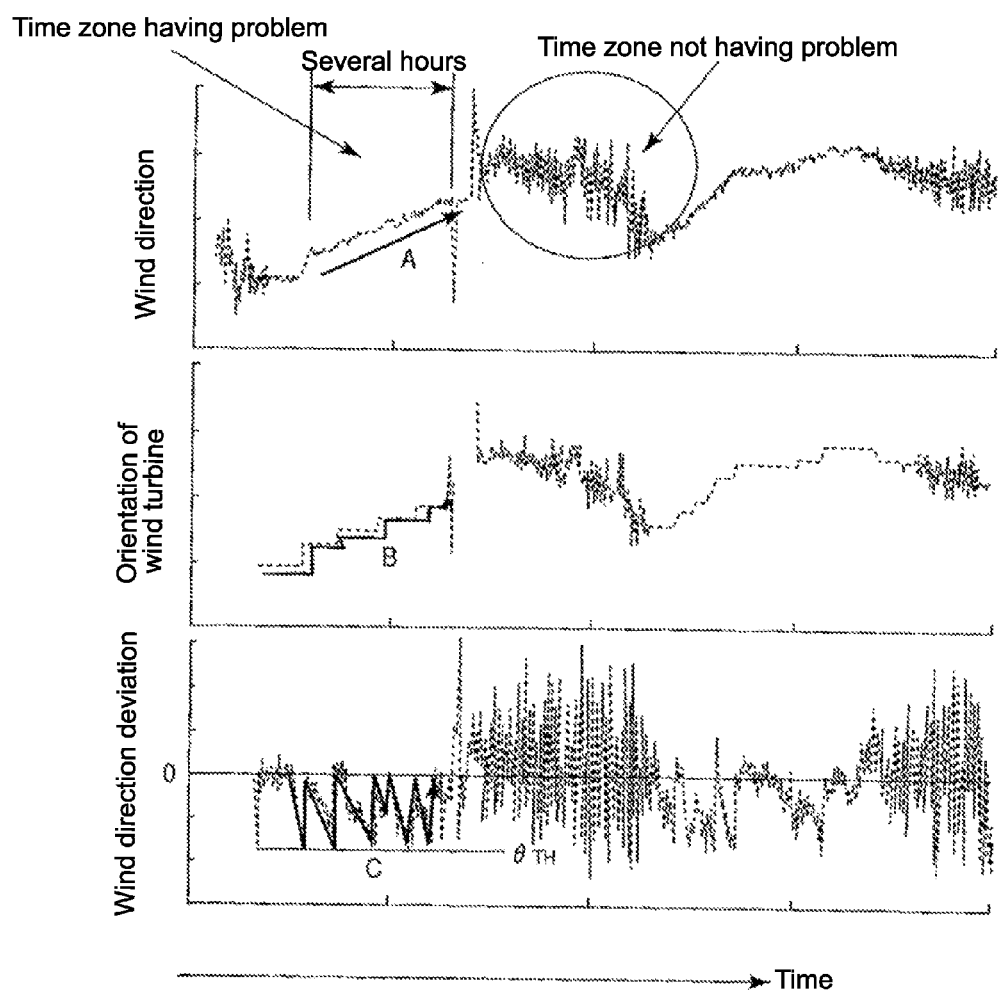
FIG. 19 shows graphs illustrating problems of the control logic in the related art.

FIG. 12 is a view that comparing the yaw control, which is performed by a control logic in the related art shown in FIG. 18, with the yaw control that is performed by a control logic of the first intermediate embodiment. In detail, FIG. 12(a) is a graph showing the change of the wind direction deviation that corresponds to the control logic in the related art. Specifically, FIG. 12(a) shows the change of the wind direction deviation when there is employed a control logic, which performs yaw rotation of the nacelle 3 so that the wind direction deviation becomes zero if the absolute value of the wind direction deviation is not less than 20° for the last 20 seconds.

Meanwhile, FIG. 12(b) is a graph showing the change in the wind direction deviation that corresponds to the control logic of this embodiment in a situation where the wind direction changes gradually over a long time, and FIG. 12(c) is a graph showing the change in the wind direction deviation that corresponds to the control logic of this embodiment in a situation where the wind direction changes at random so that the degree of turbulence is large. Here, the threshold $\theta_{TH1}$ of Condition (1) is set to 20°, the duration $T_1$ is set to 20 seconds, the threshold $\theta_{TH2}$ of Condition (2) is set to 5°, and the duration $T_2$ is set to 100 seconds.

In the control logic in the related art shown in FIG. 12(a), yaw rotation is not performed until the absolute value of the wind direction deviation exceeds a threshold of 20° even when the wind direction changes gradually over a long time. Accordingly, the average wind direction deviation is increased. For certain, if the threshold starting the yaw rotation is set low (for example, set to 5°) even in the control logic in the related art, it may be possible to reduce the average wind direction deviation. However, the number of yaw rotations increases in this approach.

Meanwhile, in the control logic of the first intermediate embodiment shown in FIGS. 12(b) and 12(c), it may be possible to reduce the average wind direction deviation and to suppress an increase of the number of the yaw rotation at the same time. If Condition (2) is satisfied in a situation where the wind direction changes gradually over a long time, the yaw rotation is performed. Since the threshold $\theta_{TH2}$ is set relatively low in Condition (2) (set to 5° in the embodiment of FIG. 12(b)), it may be possible to make the average wind direction deviation small. In addition, since the duration $T_2$ of Condition (2) is set to be relatively long, an increase in the number of yaw rotations is suppressed. Meanwhile, if Condition (1) is satisfied in the situation where the wind direction changes at random so that the degree of turbulence is large, yaw rotation is performed. Since the threshold $\theta_{TH1}$ is set to be relatively large in Condition (1), yaw rotation is performed only when being needed actually. Accordingly, it may be possible to suppress an increase in the number of yaw rotations.

In this way, it may be possible to further reduce the average wind direction deviation than the related art and to suppress an increase in the number of yaw rotations at the same time by the first intermediate embodiment. However, since there is room for improvement of the condition of the yaw rotation when the stop condition of the yaw rotation or the wind direction is transitionally changed, it is considered that it may be possible to further reduce the average wind direction deviation and to suppress the increase of the number of the yaw rotation.

Second Intermediate Embodiment

In a second intermediate embodiment, it is determined which situation of "a situation where the wind direction changes at random so that the degree of turbulence is large" (first situation) and "a situation where the wind direction changes gradually over a long time" (second situation) the current wind situation corresponds to. A different control logic is used in accordance with the result of the determination. The configuration of the wind turbine generator 1 is the same as that of the first intermediate embodiment.

In the second intermediate embodiment, the controller 21 determines which situation of the two situations the current wind situation corresponds to, by the following control logic from the wind direction data obtained by the wind vane/anemometer 10. The controller 21 consecutively calculates an average wind direction during the latest predetermined time in the past (for example, for the latest one minute in the past). Further, if a period, where a difference between the average wind direction that has been calculated latest and the average wind direction that is calculated just before the calculation of the average wind direction is within a predetermined angle, continues for a predetermined time, the controller 21 determines that the current wind situation is the second situation where the wind direction changes gradually over a long time. Unless the above-mentioned period continues for a predetermined time, the controller 21 determines that the current wind situation is the first situation where the wind direction changes at random so that the degree of turbulence is large. As shown in FIG. 13, it may be possible to determine two situations with some accuracy by using the control logic.

There may be used a control logic determining that the wind situation is "a situation where the wind direction changes at random so that the degree of turbulence is large" in a specific period of one day (or of one year) and determining that the wind situation is "a situation where the wind direction changes gradually over a long time" in other specific periods. From data observed in the past, it may be possible to appropriately decide a period where the wind situation is considered as "a situation where the wind direction changes at random so that the degree of turbulence is large" and a period where the wind situation is considered as "a situation where the wind direction changes gradually over a long time". According to this control logic, it may be possible to easily determine which situation of the above-mentioned situations the current wind situation corresponds to.

If it is determined that the current wind situation is "a situation where the wind direction changes at random so that the degree of turbulence is large", the controller 21 performs yaw rotation so that the wind direction deviation becomes zero when a state where the absolute value of the wind direction deviation is not less than a predetermined threshold $\theta_{TH1}$ (or exceeds a threshold $\theta_{TH1}$) continues for a predetermined duration $T_1$ seconds (for example, for 20 seconds).

Meanwhile, if it is determined that the current wind situation is "a situation where the wind direction changes gradually over a long time", the controller 21 performs yaw rotation so that the sign of the wind direction deviation becomes opposite before and after the yaw rotation when a state where the absolute value of the wind direction deviation is not less than a predetermined threshold $\theta_{TH2}$ (or exceeds a threshold $\theta_{TH2}$) continues for a predetermined duration $T_2$ seconds (for example, for 20 seconds), and the absolute value of the wind direction deviation after the yaw rotation becomes equal to the threshold $\theta_{TH2}$. For example, considering a case where the threshold $\theta_{TH2}$ is set to 10°, if a state where the wind direction deviation exceeds to +10° continues for a predetermined duration T (for example, 20 seconds), yaw rotation is performed so that the wind direction deviation becomes −10°.

Figure 14:
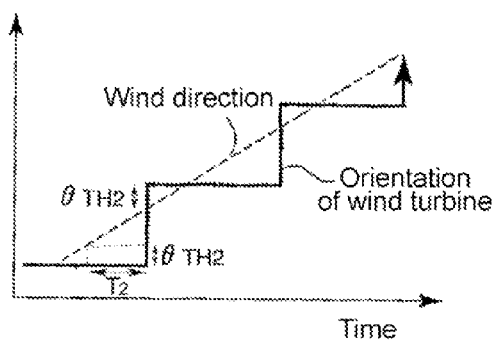
FIG. 14 shows graphs showing the change of the orientation of the wind turbine that is caused by a control logic of a second intermediate embodiment, and a change in the orientation of the wind turbine that is caused by the control logic in the related art.
Figure 14:
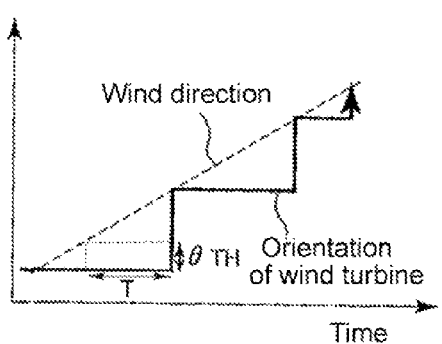

FIG. 14(a) is a graph showing a relationship between a wind direction and the orientation of a wind turbine when yaw control is performed by the control logic of the second intermediate embodiment in a situation where the wind direction changes gradually over a long time. It is assumed that the change in the wind direction is constant in the graph of FIG.

14(a). As understood from FIG. 14(a), even when the change in the wind direction is constant, the wind direction deviation (that is, a difference between a wind direction and the orientation of a wind turbine) alternately has a positive value and a negative value in the control logic of this embodiment. Accordingly, an average of the wind direction deviation approaches zero. In addition, even though a threshold $\theta_{TH2}$ used in a situation where the wind direction changes gradually over a long time is set to be small in the control logic of this embodiment, the number of yaw rotations is not increased so much. The reason for this is that the deviation $\Delta\theta(t)$ of the wind direction is changed in a range including "$-\theta_{TH2} \leq \Delta\theta(t) \leq +\theta_{TH2}$" (not between zero and $+\theta_{TH2}$ or between zero and $-\theta_{TH2}$) in a situation where the wind direction changes gradually over a long time in this embodiment. If the threshold $\theta_{TH2}$ is set low, the average of the wind direction deviation approaches zero. Accordingly, the setting of the small threshold is effective.

Meanwhile, in the control logic in the related art where the wind direction deviation after yaw rotation is zero, as shown in FIG. 14(b), the wind direction deviation always becomes positive or negative in a situation where the wind direction changes gradually over a long time. This increases an average of the magnitude of the wind direction deviation. It should be noted that FIG. 14(b) shows that the wind direction deviation is always negative.

Figure 15:
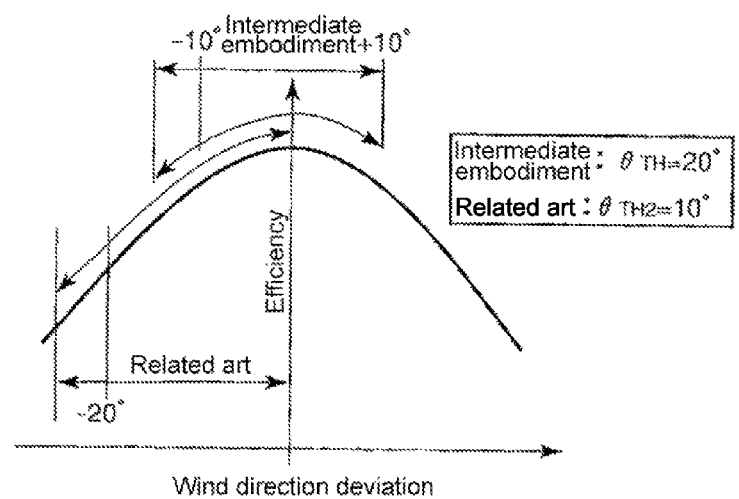
FIG. 15 is a graph showing the efficiency of a wind turbine generator that is obtained by the control logic of the intermediate embodiment and the control logic in the related art in a case where the rate of change in the wind direction is constant and the width of change of the wind direction deviation is the same.

FIG. 15 is a graph showing the superiority of the control logic of the second intermediate embodiment to the control logic in the related art more clearly. In detail, FIG. 15 shows the efficiency of the wind turbine generator 1 when the rate of change in the wind direction is constant and the width of change of the wind direction deviation of the control logic of this intermediate embodiment is equal to that of the control logic in the related art. It should be noted that conditions that the rate of change in the wind direction is constant and the width of change of the wind direction deviation of the control logic of this intermediate embodiment is equal to that of the control logic in the related art are decided from the fact that the number of yaw rotations of the control logic of this intermediate embodiment is equal to that of the control logic in the related art. More specifically, FIG. 15 shows cases where a threshold $\theta_{TH2}$ is set to 10° in the control logic of this intermediate embodiment and a threshold $\theta_{TH}$ starting the yaw rotation is set to 20° in the control logic in the related art. Since the width of change of the wind direction deviation is the same even in any case, the number of yaw rotations is also the same.

As shown in FIG. 15, the wind direction deviation is changed in the range of −20° to zero in the control logic in the related art, but the wind direction deviation is changed in the range of −10° to +10° in the control logic of this intermediate embodiment. As the absolute value of the wind direction deviation increases, the efficiency of the wind turbine generator 1 rapidly decreases. Accordingly, in the control logic in the related art, the efficiency of the wind turbine generator 1 decreases when the wind direction deviation is particularly in the range of −20° to −10°. Meanwhile, in the control logic of this intermediate embodiment, the decrease in the efficiency of the wind turbine generator 1 is small when the wind direction deviation is in the range of −10° to +10°.

If a threshold $\theta_{TH}$ starting the yaw rotation is set to be small (for example, set to 10°) even in the control logic in the related art, an average of the magnitude of the wind direction deviation decreases. However, if the threshold $\theta_{TH}$ is set to be small, the number of yaw rotations increases. In the control logic in the related art, the suppression of an increase in the number of yaw rotations may be incompatible with the reduction of the average of the absolute value of the wind direction deviation.

If the wind turbine generator 1 of the second intermediate embodiment is in a situation where the wind direction changes gradually over a long time as described above, yaw rotation is performed so that the sign of the wind direction deviation becomes opposite before and after the yaw rotation and the absolute value of the wind direction deviation after the yaw rotation becomes equal to the threshold $\theta_{TH2}$. Accordingly, it may be possible to reduce the average of the absolute value of the wind direction deviation while suppressing an increase in the number of yaw rotations.

In the second intermediate embodiment, yaw rotation may be performed so that the absolute value of the wind direction deviation after the yaw rotation becomes a value between the threshold $\theta_{TH2}$ and zero. For example, if a state where the wind direction deviation exceeds +7.5° continues for a predetermined duration (for example, 20 seconds) when the threshold $\theta_{TH2}$ is 7.5°, yaw rotation may be performed so that the wind direction deviation becomes −4°. However, in order to reduce the average of the absolute value of the wind direction deviation, it is preferable to perform yaw rotation so that the absolute value of the wind direction deviation after the yaw rotation becomes equal to the threshold $\theta_{TH2}$.

Further, the combination of the yaw control of the first intermediate embodiment and the yaw control of the second intermediate embodiment may be performed. More specifically, if Condition (2) of the yaw control of the first intermediate embodiment is satisfied, yaw rotation is performed so that the sign of the wind direction deviation becomes opposite before and after the yaw rotation and the absolute value of the wind direction deviation after the yaw rotation becomes equal to the threshold $\theta_{TH2}$ (the absolute value of the wind direction deviation after the yaw rotation becomes a value between the threshold $\theta_{TH2}$ and zero). If Condition (1) is satisfied, yaw rotation is performed so that the wind direction deviation becomes zero.

It is considered that Condition (2) of the first intermediate embodiment corresponds to a case where the wind situation is "a situation where the wind direction changes gradually over a long time". For this reason, if Condition (2) is satisfied, it is preferable that yaw rotation is performed so that the sign of the wind direction deviation becomes opposite before and after the yaw rotation and the absolute value of the wind direction deviation after the yaw rotation becomes equal to the threshold $\theta_{TH2}$.

The average wind direction deviation is further reduced by the second intermediate embodiment in this way, so that the efficiency of the wind turbine generator 1 is improved. However, since there is room for improvement in the condition of the yaw rotation when the stop condition of the yaw rotation or the wind direction is transitionally changed, it is considered that it may be possible to further reduce the average wind direction deviation and to suppress an increase of the number of the yaw rotation.

Third Intermediate Embodiment

Another problem of the control logic in the related art, which performs yaw rotation when a state where the absolute value of the wind direction deviation is larger than a predetermined threshold continues for a predetermined duration, is not to be capable of detecting transitional changes in the wind direction. FIG. 16(a) is a graph showing the problem of the control logic in the related art shown in FIG. 18. In the control logic in the related art, the change of the wind direction deviation is ignored unless the wind direction deviation exceeds a threshold. Accordingly, it may not be possible to detect the transitional change of the wind direction deviation. For this reason, time, which has passed until yaw rotation is actually performed after the wind direction starts to be changed, is lengthened in the control logic in the related art as shown in FIG. 16(a). As a result, a state where the wind direction deviation is large, that is, a state where the efficiency of the wind turbine generator 1 deteriorates continues for a long time.

In the third intermediate embodiment, there is employed a control logic that performs yaw rotation at an accurate timing by detecting transitional changes in the wind direction. More specifically, in the third intermediate embodiment, there is employed a control logic for performing yaw rotation so that the wind direction deviation becomes zero if the following conditions are satisfied about all of time t satisfying "$t_0-T \leq t \leq t_0$" assuming that the current time is denoted by $t_0$.

$$|\Delta\theta(t)| \geq \theta_{TH}(t) \quad (1a)$$

or $$|\Delta\theta(t)| > \theta_{TH}(t) \quad (1b)$$

Here, |Δθ(t)| denotes the absolute value of the wind direction deviation at a time t, T denotes a predetermined value, and $\theta_{TH}(t)$ denotes a threshold that is used for the determination of the start of the yaw rotation and is a function that broadly uniformly increases in the range of "$t_0-T \leq t \leq t_0$". In the third intermediate embodiment, it should be noted that the threshold is increased with time. T corresponds to the length of a period that is used for the determination of the yaw rotation. Here, "broadly" means that a range having constant $\theta_{TH}(t)$ may exist in the range of "$t_0-T \leq t \leq t_0$". However, $\theta_{TH}(t)$ should not be set to be constant in the entire range of "$t_0-T \leq t \leq t_0$".

In this control logic, as shown in FIG. 16(b), it may be possible to perform yaw rotation at a timing as early as possible by detecting transitional changes in the wind direction. In detail, since a threshold $\theta_{TH}$ starting the yaw rotation is increased with time in the control logic of the third intermediate embodiment, it may be possible to consider the change of the wind direction deviation in an initial period where the absolute value of the wind direction deviation is still small, in the determination of the start of the yaw rotation. Accordingly, according to the control logic of the intermediate embodiment, it may be possible to perform yaw rotation at an accurate timing by detecting transitional changes in the wind direction. This is effective in improving the efficiency of the wind turbine generator 1.

In the third intermediate embodiment, the function $\theta_{TH}(t)$ is set as follows:

$$\theta_{TH}(t) = \theta_{TH}\sqrt{1 - \frac{(t-t_0)^2}{T^2}}$$

However, $\theta_{TH}$ denotes a predetermined constant. In this case, the shape of a graph of a function $\theta_{TH}(t)$ is similar to a part of a circle or an ellipse as shown in FIG. 16(b). It will be apparent to those in the art that the function $\theta_{TH}(t)$ defined by Formula (2) is a function (narrowly) uniformly increasing in the entire range of "$t_0-T \leq t \leq t_0$" and a derived function $d\theta_{TH}(t)/dt$ thereof is also a function (narrowly) uniformly decreasing in the entire range of "$t_0-T \leq t \leq t_0$".

Figure 17:
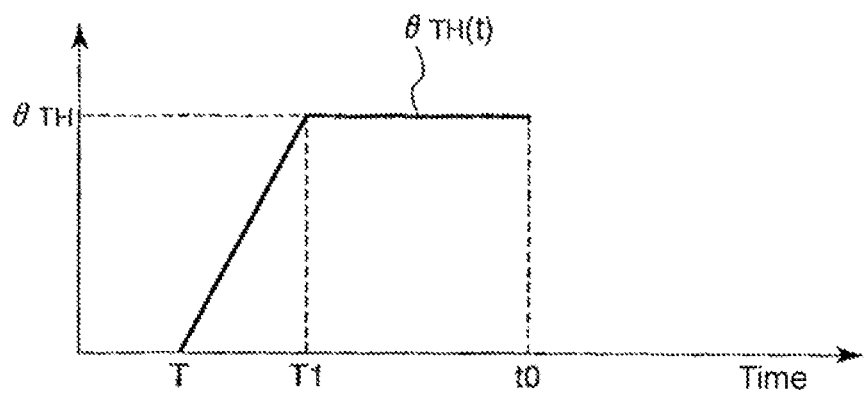
FIG. 17 is a graph showing an example of a function $\theta_{TH}(t)$.

In another embodiment, it will be apparent to those in the art, as shown in FIG. 17, a function $\theta_{TH}(t)$ may be set as follows:

$$\theta_{TH}(t) = \theta_{TH} (T_1 \leq t \leq t_0) \quad (3a)$$

$$\theta_{TH}(t) = a(t-T_1) + \theta_{TH} (T \leq t \leq T_1) \quad (3b)$$

Here, "a" is a positive constant. It will be apparent to those in the art that the function $\theta_{TH}(t)$ defined by Formula (2) is a function broadly uniformly increasing in the entire range of "$t_0-T \leq t \leq t_0$" and a derived function $d\theta_{TH}(t)/dt$ thereof is also a function broadly uniformly decreasing in the entire range of "$t_0-T \leq t \leq t_0$".

In this way, it may be possible to cope with transitional changes in the wind direction by the third intermediate embodiment. However, there is room for improvement of the stop condition of the yaw rotation, and it is difficult to cope with transitional changes in the wind direction if the wind situation is not "a situation where the wind direction changes at random so that the degree of turbulence is large" in the third intermediate embodiment. For this reason, the third intermediate embodiment needs to be improved so as to also cope with "a situation where the wind direction changes gradually over a long time".

Example 1

Example 1 uses a technique obtained by improving the stop condition of the yaw rotation, which has been the task of the above-mentioned first to third intermediate embodiments. The configuration of the wind turbine generator 1 is the same as those of the first to third intermediate embodiments.

Figure 1:
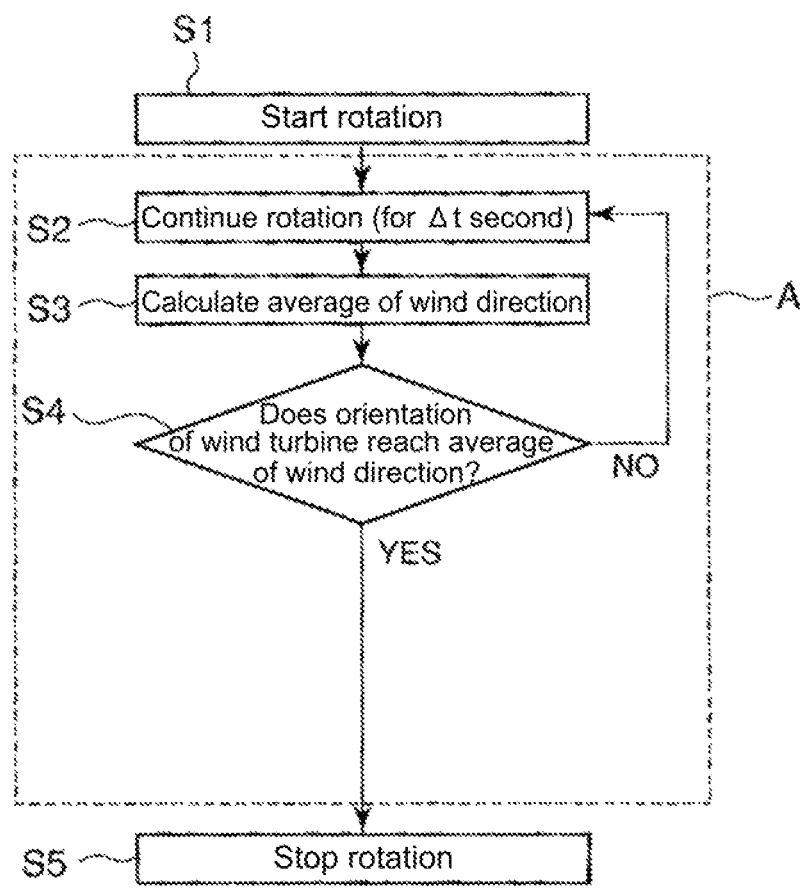
FIG. 1 is a flowchart illustrating a procedure of yaw rotation control that is performed by a controller of Example 1.

FIG. 1 is a flowchart illustrating a procedure of yaw rotation control that is performed by a controller 21 of Example 1. The yaw rotation control of Example 1 will be described with reference to FIG. 1.

If a specific condition is satisfied in Step S1, yaw rotation starts.

The specific condition of Step S1 will be described.

A wind vane/anemometer 10 measures a wind direction, which corresponds to each time, at predetermined sampling intervals, and supplies wind direction data, which represent the wind direction corresponding to each time, to a controller 21. In the wind direction data, the wind direction is defined as an angle that is formed by a predetermined reference direction.

Further, the controller 21 performs the yaw rotation of a nacelle 3 by controlling a motor drive unit 22 and a braking mechanism drive unit 23 in response to the calculated wind direction deviation. If satisfying at least one of the following two conditions in Example 1, the controller 21 performs yaw rotation so that the wind direction deviation becomes zero (that is, in a direction that is indicated by the newest wind direction data for control).

(1) A state where the absolute value of the wind direction deviation is not less than a threshold $\theta_{TH1}$ (for example, 5°) (or exceeds $\theta_{TH1}$) continues for $T_1$ seconds (for example, 100 seconds).

(2) A state where the absolute value of the wind direction deviation is not less than a threshold $\theta_{TH2}$ (for example, 20°) ($>\theta_{TH1}$) (or exceeds $\theta_{TH2}$) continues for $T_2$ (for example, 20 seconds) ($<T_1$) seconds.

The start condition of yaw rotation in Step S1 is the same as that of the yaw rotation in the above-mentioned first intermediate embodiment.

If the yaw rotation starts in Step S1, stopping the yaw rotation is determined by a stop logic shown in FIG. 1 by a broken line.

In the stop logic, first, the yaw rotation continues for a predetermined time Δt in Step S2.

If the yaw rotation continues for a predetermined time Δt in Step S2, an average of the wind direction is calculated in Step S3. Here, assuming that the current time is denoted by $t_0$ and T denotes a predetermined value, the average of the wind direction is an average of the wind direction in the range of the time $t_0$–T to the time $t_0$. The wind vane/anemometer 10 measures a wind direction, which corresponds to each time, at predetermined sampling intervals, and the controller 21 calculates an average of the wind direction by using wind direction data that are supplied to the controller 21 and represent the wind direction corresponding to each time.

If the average of the wind direction is calculated in Step S3, it is determined in Step S4 whether the orientation of the wind turbine (the direction of the wind turbine rotor 7) reaches the average of the wind direction.

If it is determined in Step S4 that the orientation of the wind turbine does not reach the average of the wind direction, Steps S2 to S4 are repeated until the orientation of the wind turbine reaches the average of the wind direction.

If it is determined in Step S4 that the orientation of the wind turbine reaches the average of the wind direction, the yaw rotation is stopped in Step S5.

Figure 2:
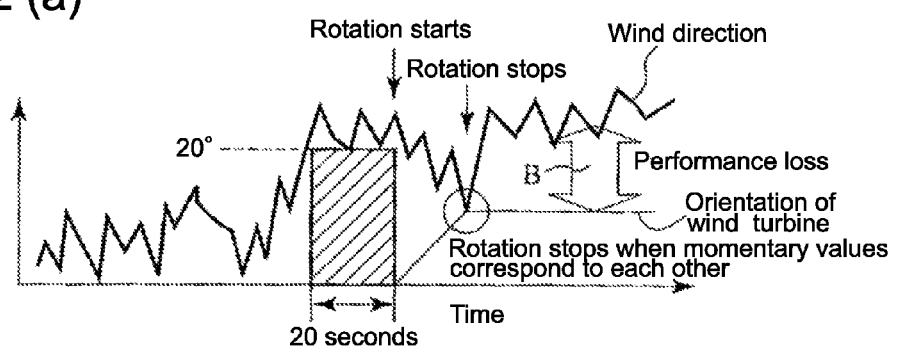
FIG. 2 is a view comparing the yaw control, which is performed by control logics in the related art and of intermediate embodiments during the stopping of yaw rotation, with the yaw control that is performed by a control logic of Example 1.
Figure 2:
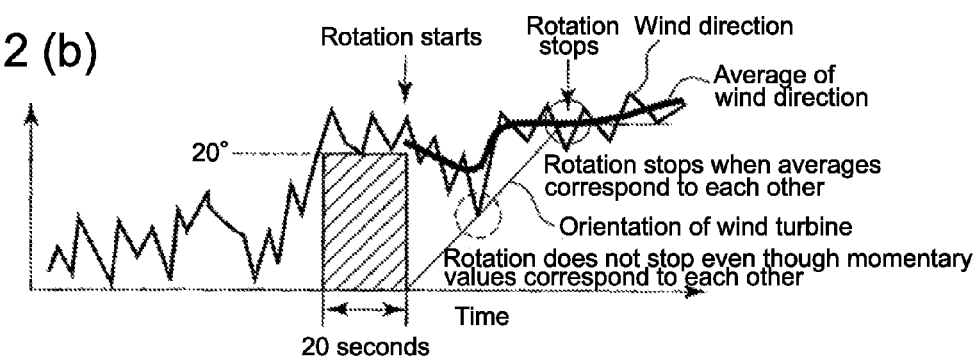

FIG. 2 is a view comparing the yaw control, which is performed by control logics in the related art and of the first and third intermediate embodiments during the stopping of yaw rotation, with the yaw control that is performed by a control logic of Example 1. In detail, FIG. 2(*a*) is a graph showing the changes in the wind direction and the orientation of the wind turbine that are caused by the control logics in the related art and of intermediate embodiments. Specifically, FIG. 2(*a*) shows an average of the wind direction and the change of the orientation of the wind turbine when there is employed a control logic, which performs yaw rotation of the nacelle 3 so that the wind direction deviation becomes zero if the absolute value of the wind direction deviation is not less than 20° for the last 20 seconds.

Meanwhile, FIG. 2(*b*) is a graph showing the changes in the wind direction and the orientation of the wind turbine that are caused by a control logic of Example 1. Specifically, FIG. 2(*b*) shows an average of the wind direction and the change of the orientation of the wind turbine when there is employed a control logic, which performs yaw rotation of the nacelle 3 so that the difference between the average of the wind direction and the orientation of the wind turbine becomes zero if the absolute value of the wind direction deviation is not less than 20° for the last 20 seconds.

In the control logic in the related art or of the intermediate embodiment that is shown in FIG. 2(*a*), the yaw rotation is stopped even though the wind direction and the orientation of the wind turbine momentarily correspond to each other by the momentary change in the wind direction after the start of the yaw rotation. For this reason, performance loss as much as the loss shown by the arrow B in FIG. 2(*a*) is generated, so that the average wind direction deviation increases. Even in the control logic in the related art or of the intermediate embodiment, the average wind direction deviation does not increase if there is no momentary change in the wind direction. However, it is not possible to prevent natural wind from changing momentarily.

Meanwhile, in the control logic of Example 1 that is shown in FIG. 2(*b*), control is performed so that the yaw rotation is stopped when the difference between the average of the wind direction and the orientation of the wind turbine becomes zero. Accordingly, even though the wind direction and the orientation of the wind turbine momentarily correspond to each other due to a momentary change in the wind direction, it may be possible to stop the yaw rotation at an appropriate position without the stop of the yaw rotation.

Meanwhile, FIG. 2 has shown an example where yaw rotation starts in Condition (2), that is, if the absolute value of the wind direction deviation is not less than 20° for the last 20 seconds. However, even though yaw rotation starts in Condition (1), the control of stopping the yaw rotation is the same.

Example 2

Example 2 uses a technique obtained by improving the stop condition of the yaw rotation, which has been the task of the above-mentioned first to third intermediate embodiments. The configuration of the wind turbine generator 1 is the same as that of Example 1.

Figure 3:
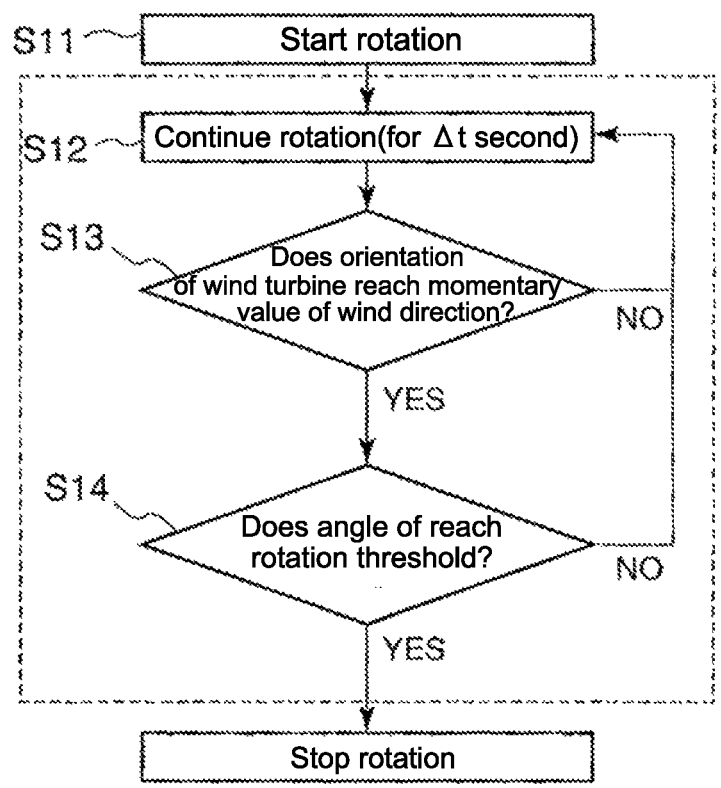
FIG. 3 is a flowchart illustrating a procedure of yaw rotation control that is performed by the controller of Example 2.

FIG. 3 is a flowchart illustrating a procedure of yaw rotation control that is performed by a controller 21 of Example 2. The yaw rotation control of Example 2 will be described with reference to FIG. 3.

If a specific condition is satisfied in Step S11, yaw rotation starts.

Since the specific condition of Step S11 is the same as that of Step S1 of Example 1, the description of the specific condition of Step S11 will be omitted.

If the yaw rotation starts in Step S11, stopping the yaw rotation is determined by a stop logic shown in FIG. 3 by a broken line.

In the stop logic, first, the yaw rotation continues for a predetermined time Δt in Step S12.

If the yaw rotation continues for a predetermined time Δt in Step S12, it is determined in Step S13 whether the orientation of the wind turbine (the direction of the wind turbine rotor 7) reaches the wind direction.

If it is determined in Step S13 that the orientation of the wind turbine reaches the wind direction, it is determined in Step S14 whether an angle of yaw rotation reaches the rotation threshold.

Here, the rotation threshold means $\theta_{TH1}$ and $\theta_{TH2}$ of Conditions (1) and (2). The rotation threshold in Step S4 is determined using $\theta_{TH1}$ when Condition (1) is satisfied and the yaw rotation thus starts, and the rotation threshold in Step S4 is determined using $\theta_{TH2}$ when Condition (2) is satisfied and the yaw rotation thus starts.

If it is determined in Step S14 that an angle of yaw rotation does not reach the rotation threshold, Steps S12 to S14 are repeated until it is determined in Step S14 that the angle of yaw rotation reaches the rotation threshold.

If it is determined in Step S14 that an angle of yaw rotation reaches the rotation threshold, the yaw rotation is stopped in Step S15.

Figure 4:
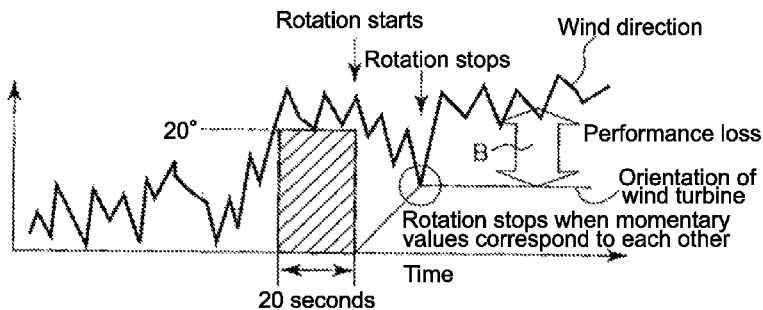
FIG. 4 is a view comparing the yaw control, which is performed by a control logic during the stopping of yaw rotation in the related art and an intermediate embodiment, with the yaw control that is performed by a control logic of Example 2.
Figure 4:
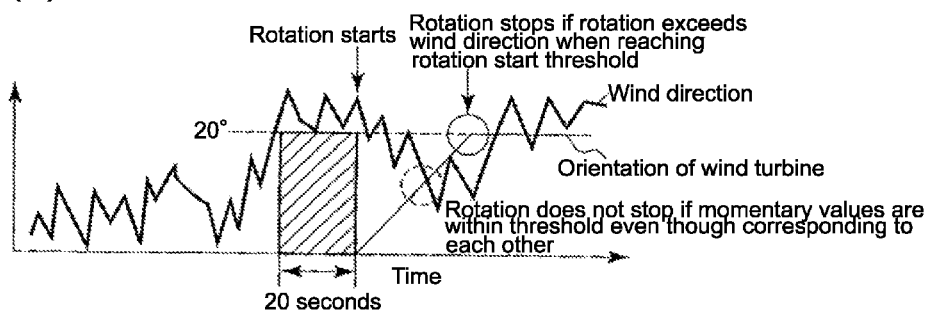
Figure 4:
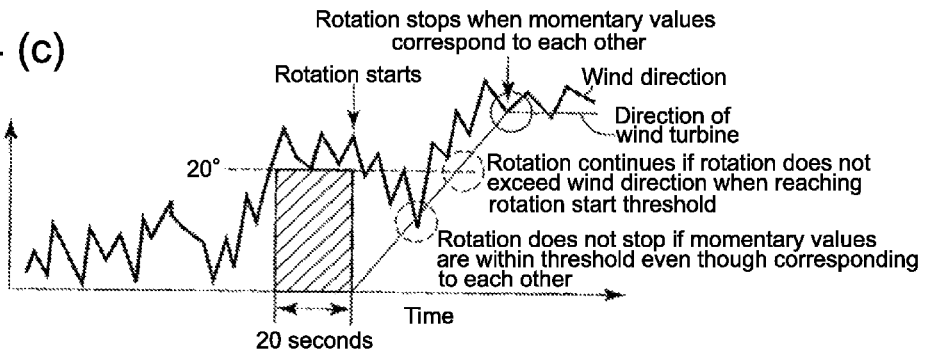

FIG. 4 is a view comparing the yaw control, which is performed by control logics in the related art and of the first and third intermediate embodiments during the stopping of yaw rotation, with the yaw control that is performed by a control logic of Example 2. In detail, FIG. 4(*a*) is a graph showing the changes in the wind direction and the orientation of the wind turbine that are caused by the control logics in the related art and of intermediate embodiments. Specifically, FIG. 4(*a*) shows the changes in the wind direction and the orientation of the wind turbine when there is employed a control logic, which performs yaw rotation of the nacelle 3 so that the wind direction deviation becomes zero if the absolute value of the wind direction deviation is not less than 20° for the last 20 seconds.

FIGS. 4(*b*) and 4(*c*) are graphs showing the changes in the wind direction and the orientation of the wind turbine that are caused by a control logic of Example 2. Specifically, FIG. 4(b) shows the changes in the wind direction and the orientation of the wind turbine when yaw rotation starts if the absolute value of the wind direction deviation is not less than 20° for the last 20 seconds, the orientation of the wind turbine reverses the wind direction at the time of the yaw rotation of 20°, and the yaw rotation is stopped at the time of the yaw rotation of 20°. FIG. 4(c) shows the changes in the wind direction and the orientation of the wind turbine when yaw rotation starts if the absolute value of the wind direction deviation is not less than 20° for the last 20 seconds, the yaw rotation continues as it is since the orientation of the wind turbine does not reverse the wind direction at the time of the yaw rotation of 20°, and the yaw rotation is performed if the difference between the wind direction and the orientation of the wind turbine becomes zero.

In the control logic in the related art or of the intermediate embodiment that is shown in FIG. 4(a), the yaw rotation is stopped even though the wind direction and the orientation of the wind turbine momentarily correspond to each other by the momentary change in the wind direction after the start of the yaw rotation. For this reason, performance loss as much as the loss shown by the arrow B in FIG. 4(a) is generated, so that the average wind direction deviation is increased. Even in the control logic in the related art or of the intermediate embodiment, the average wind direction deviation is not increased if there is no momentary change in the wind direction. However, it is not possible to prevent natural wind from being momentarily changed.

Meanwhile, in the control logic of Example 2 that is shown in FIGS. 4(b) and 4(c), in order to perform the yaw rotation by an angle corresponding to at least the rotation threshold, even though the wind direction changes momentarily before the yaw rotation reaches the rotation threshold and the wind direction and the orientation of the wind turbine momentarily correspond to each other, it may be possible to stop the yaw rotation at an appropriate position without the stop of the yaw rotation.

Meanwhile, if being applied to "a situation where the wind direction changes gradually over a long time", and the control of Example 2 is effective.

Example 3

In Example 3, yaw rotation is stopped at a further appropriate position by the combination of techniques described in Examples 1 and 2. The configuration of the wind turbine generator 1 is the same as those of Examples 1 and 2.

Figure 5:
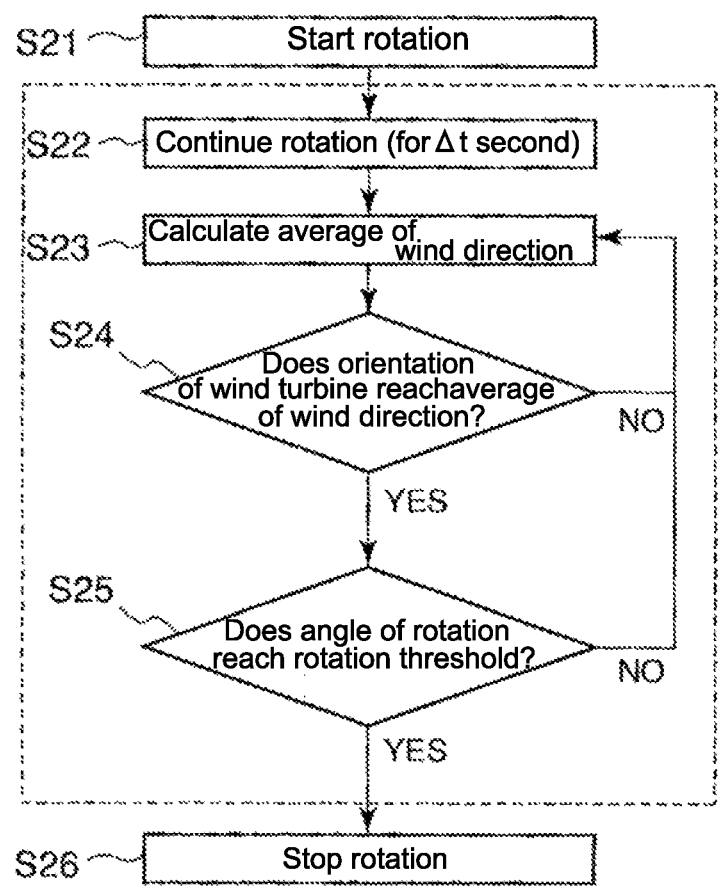
FIG. 5 is a flowchart illustrating a procedure of yaw rotation control that is performed by a controller of Example 3.

FIG. 5 is a flowchart illustrating a procedure of yaw rotation control that is performed by a controller 21 of Example 3. The yaw rotation control of Example 3 will be described with reference to FIG. 5.

If a specific condition is satisfied in Step S21, yaw rotation starts.

Since the specific condition of Step S21 is the same as that of Step S1 of Example 1, the description of the specific condition of Step S11 will be omitted.

If the yaw rotation starts in Step S21, stopping the yaw rotation is determined by a stop logic shown in FIG. 3 by a broken line.

In the stop logic, first, the yaw rotation continues for a predetermined time Δt in Step S22.

If the yaw rotation continues for a predetermined time Δt in Step S22, an average of the wind direction is calculated in Step S23. Since an average of the wind direction has been described in Example 1, the description of an average of the wind direction will be omitted here.

If an average of the wind direction is calculated in Step S23, it is determined in Step S24 whether the orientation of the wind turbine (the direction of the wind turbine rotor 7) reaches the average of the wind direction.

If it is determined in Step S24 that the orientation of the wind turbine does not reach the average of the wind direction, Steps S22 to S24 are repeated until the orientation of the wind turbine reaches the average of the wind direction.

If it is determined in Step S24 that the orientation of the wind turbine reaches the average of the wind direction, it is determined in Step S25 whether an angle of yaw rotation reaches the rotation threshold.

If it is determined in Step S25 that an angle of yaw rotation does not reach the rotation threshold, Steps S22 to S25 are repeated until it is determined in Step 25 that an angle of yaw rotation reaches the rotation threshold.

If it is determined in Step 25 that an angle of yaw rotation reaches the rotation threshold, the yaw rotation is stopped in Step S26.

Figure 6:
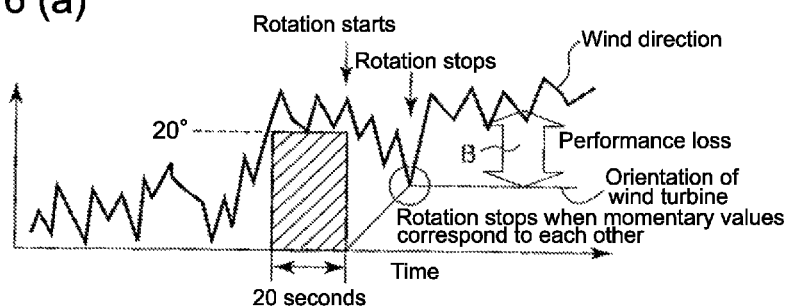
FIG. 6 is a view comparing the yaw control, which is performed by a control logic during the stopping of yaw rotation in the related art and an intermediate embodiment, with the yaw control that is performed by a control logic of Example 3.
Figure 6:
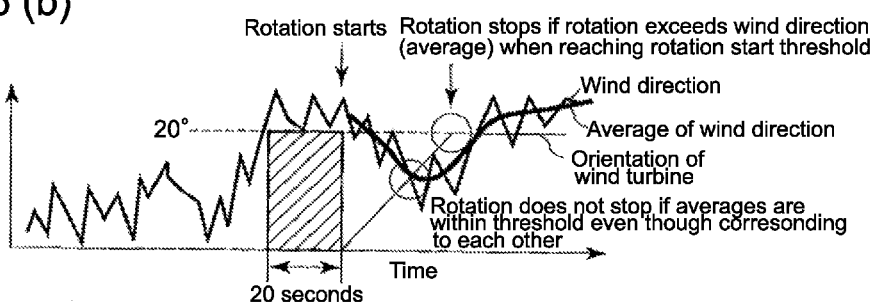
Figure 6:
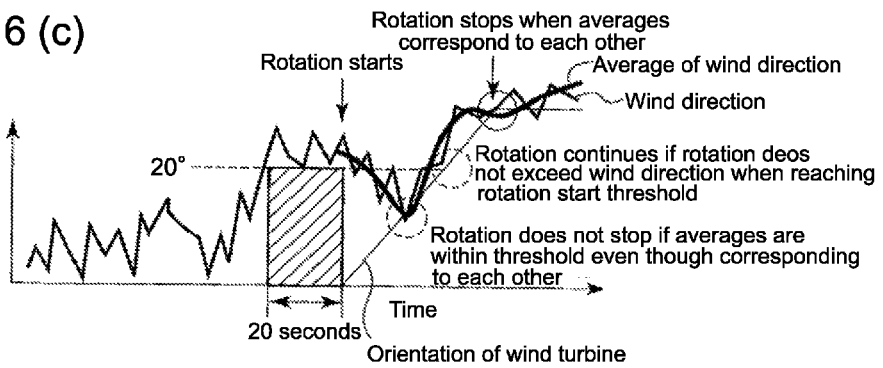

FIG. 6 is a view comparing the yaw control, which is performed by control logics in the related art and of the first and third intermediate embodiments during the stopping of yaw rotation, with the yaw control that is performed by a control logic of Example 3. In detail, FIG. 6(a) is a graph showing the changes in the wind direction and the orientation of the wind turbine that are caused by the control logics in the related art and of intermediate embodiments. Specifically, FIG. 6(a) shows the changes in the wind direction and the orientation of the wind turbine when there is employed a control logic, which performs yaw rotation of the nacelle 3 so that the wind direction deviation becomes zero if the absolute value of the wind direction deviation is not less than 20° for the last 20 seconds.

FIGS. 6(b) and 6(c) are graphs showing the changes in the wind direction and the orientation of the wind turbine that are caused by a control logic of Example 3. Specifically, FIG. 6(b) shows the changes of an average of the wind direction and the orientation of the wind turbine when yaw rotation starts if the absolute value of the wind direction deviation is not less than 20° for the last 20 seconds, the orientation of the wind turbine reverses an average of the wind direction at the time of the yaw rotation of 20°, and the yaw rotation is stopped at the time of the yaw rotation of 20°. FIG. 6(c) shows the changes of an average of the wind direction and the orientation of the wind turbine when yaw rotation starts if the absolute value of the wind direction deviation is not less than 20° for the last 20 seconds, the yaw rotation continues as it is since the orientation of the wind turbine does not reverse an average of the wind direction at the time of the yaw rotation of 20°, and the yaw rotation is performed if the difference between the average of the wind direction and the orientation of the wind turbine becomes zero.

In the control logic in the related art or of the intermediate embodiment that is shown in FIG. 6(a), the yaw rotation is stopped even though the wind direction and the orientation of the wind turbine momentarily correspond to each other by the momentary change in the wind direction after the start of the yaw rotation. For this reason, performance loss as much as loss shown by an arrow B in FIG. 6(a) is generated, so that the average wind direction deviation is increased. Even in the control logic in the related art or of the intermediate embodiment, the average wind direction deviation is not increased if there is no momentary change in the wind direction. However, it is not possible to prevent natural wind from being momentarily changed.

Meanwhile, in the control logic of Example 2 that is shown in FIGS. 6(b) and 6(c), in order to perform the yaw rotation by an angle corresponding to at least the rotation threshold, the wind direction is momentarily changed before the yaw rotation reaches the rotation threshold. Accordingly, even though the wind direction and the orientation of the wind turbine momentarily correspond to each other, the yaw rotation is not stopped. Further, the average of the wind direction is used. Accordingly, even though the wind direction is momentarily changed and the wind direction and the orientation of the wind turbine momentarily correspond to each other when the yaw rotation continues so as to exceed the rotation threshold if the yaw rotation continues above the rotation threshold as shown in FIG. 6(c), it may be possible to stop the yaw rotation at an appropriate position without the stop of the yaw rotation.

Meanwhile, if being applied to "a situation where the wind direction changes gradually over a long time", and the control of Example 3 is effective.

Among the control of Examples 1 to 3, the control of Example 1 is always effective in improving performance and reducing the frequency of the yaw rotation, and the control of Examples 2 and 3 is particularly effective in "a situation where the wind direction changes gradually over a long time". Further, there is used the control logic, which has been described in the second intermediate embodiment, for determining which situation of "a situation where the wind direction changes at random so that the degree of turbulence is large" (first situation) and "a situation where the wind direction changes gradually over a long time" (second situation) the current wind situation corresponds to. If the yaw rotation is stopped by the control disclosed in Example 1 when the current wind situation is the first situation and the yaw rotation is stopped by the control disclosed in Example 2 or 3 when the current wind situation is the second situation, it is further effective in improving performance and reducing the frequency of the yaw rotation.

Example 4

Example 4 uses a technique obtained by improving the start condition of the yaw rotation, which has been the tasks of the above-mentioned first to third intermediate embodiments, in order to cope with transitional changes in the wind direction. The configuration of the wind turbine generator 1 is the same as those of the first to third intermediate embodiments.

FIG. 7(a) is a graph showing control logics used in Examples 1 to 3, and FIGS. 7(b) and 7(c) are graphs showing a control logic of Example 4.

A control logic, which performs yaw rotation at an accurate timing by detecting transitional changes in the wind direction, is employed in Example 4.

More specifically, the current wind situation is determined by the control logic, which has been described in the second intermediate embodiment, for determining which situation of "a situation where the wind direction changes at random so that the degree of turbulence is large" (first situation) and "a situation where the wind direction changes gradually over a long time" (second situation) the current wind situation corresponds to. Assuming that the current time is denoted by $t_0$, $T_1$ denotes a predetermined value, and time satisfying "$t_0-T_1 \leq t_s \leq t_0$" is denoted by $t_s$, the yaw rotation of the nacelle is performed when the wind direction deviation satisfies a predetermined condition about all of time t satisfying "$t_s \leq t \leq t_0$".

The predetermined condition is $|\Delta\theta(t)| \geq \theta_{TH1}(t_s)$ if the current wind situation corresponds to the first situation, and is $|\Delta\theta(t)| \geq \theta_{TH2}(t_s)$ if the current wind situation corresponds to the second situation.

Meanwhile, $|\Delta\theta(t)|$ denotes the absolute value of the wind direction deviation at each time t, $\theta_{TH1}(t)$ denotes a function that broadly uniformly increases in the range of "$t_0-T_1 \leq t \leq t_0$", and a derived function $d\theta_{TH1}(t)/dt$ of $\theta_{TH1}(t)$ with respect to time broadly uniformly decreases in the range of "$t_0-T_1 \leq t \leq t_0$" except for time t where a derived function cannot be defined. Further, $\theta_{TH2}(t)$ denotes a function that broadly uniformly increases in the range of "$t_0-T_1 \leq t \leq t_0$", and a derived function $d\theta_{TH2}(t)/dt$ of $\theta_{TH2}(t)$ with respect to time broadly uniformly increases in the range of "$t_0-T_1 \leq t \leq t_0$" except for time t where a derived function cannot be defined.

Meanwhile, $t_b$ in FIG. 7 corresponds to $t_0-T_1$.

Furthermore, in FIG. 7(b1), a curve connecting a point A with a point B and a straight line where the wind direction deviation is constant between the point A and time $t_0$ correspond to $\theta_{TH1}(t_s)$. In FIG. 7(c1), a curve connecting a point A with a point B and a straight line where the wind direction deviation is constant between the point A and time $t_0$ correspond to $\theta_{TH2}(t_s)$.

In these control logics, as shown in FIGS. 7(b2) and 7(c2), it may be possible to perform yaw rotation at a timing as early as possible by detecting transitional changes in the wind direction.

Further, in accordance with whether the current wind situation corresponds to the first situation or the second situation, it is determined which one of the conditions of the graphs shown in FIGS. 7(b1) and 7(b2) is used as the rotation condition. Accordingly, it may be possible to efficiently make the magnitude of the wind direction deviation small and to suppress the increase of the number of the yaw rotation.

Example 5

In Example 5, the number of yaw rotation, which is performed between the current time and a predetermined time, is measured and the rotation condition is changed in accordance with the measured number of the yaw rotation. Specifically, if the number of rotations for a predetermined time (for example, one hour) in the past is smaller than a predetermined number of rotations (for example, three times) at the time of the start of the yaw rotation or if time elapsed from the previous yaw rotation is longer than a predetermined time (for example, 20 minutes) at the time of the start of the yaw rotation, the rotation condition is eased. Meanwhile, if the number of rotations for a predetermined time (for example, one hour) in the past is larger than a predetermined number of rotations (for example, three times) at the time of the start of the yaw rotation or if time elapsed from the previous yaw rotation is shorter than a predetermined time (for example, 20 minutes) at the time of the start of the yaw rotation, the rotation condition is tightened.

Here, the easing of the rotation condition means the decrease of a time threshold or the decrease of an angle threshold in the condition of the rotation start, and the tightening of the rotation condition means the increase of the time threshold or the increase of the angle threshold.

Figure 8:
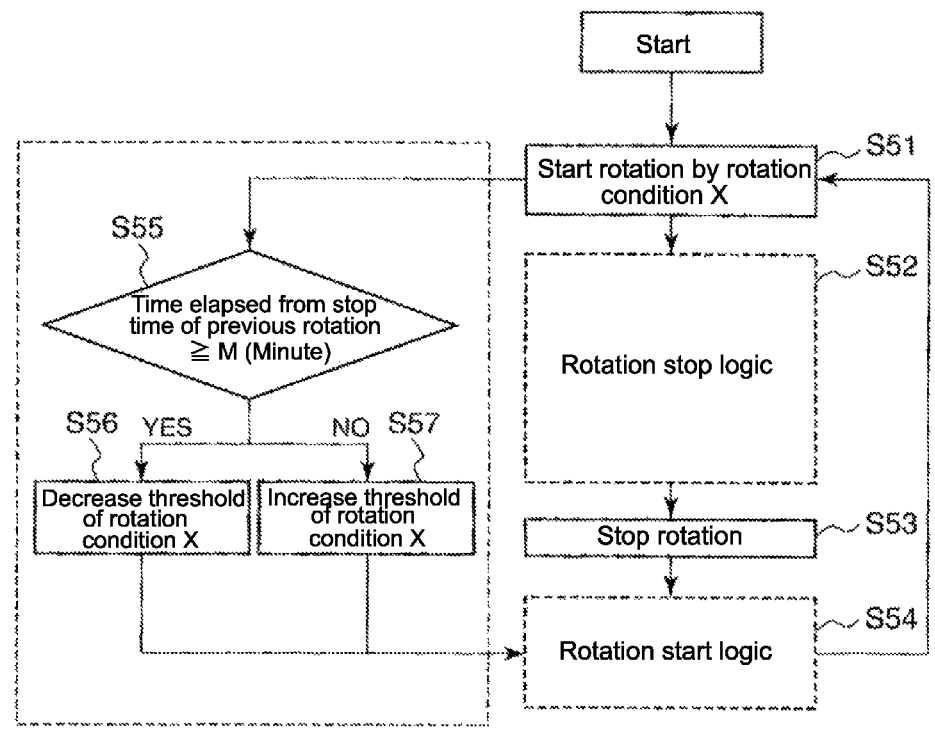
FIG. 8 is a flowchart illustrating the procedure of yaw rotation control of the invention.

FIG. 8 is a flowchart illustrating a procedure of yaw rotation control of Examples 1 to 5 of the invention.

The yaw rotation control of the invention will be described with reference to FIG. 8.

When control relating to yaw rotation starts, yaw rotation starts in Step S51 by a rotation condition X. Here, the rotation condition X is a condition for the start of the yaw rotation, and the conditions described in the first to third intermediate embodiments or the conditions described in Example 4 may be used as the rotation condition.

If the yaw rotation starts in Step S51, stopping the yaw rotation is determined in Step S52 by a rotation stop logic and the yaw rotation is stopped in Step S53. Any one of the rotation stop logics of Examples 1, 2, and 3 described with reference to FIGS. 1, 3, and 5 may be used as the rotation stop logic in Step S52.

If the yaw rotation starts in Step S51, it is determined in Step S55 whether time elapsed from the stop time of the previous yaw rotation to the start of the current yaw rotation is not less than a predetermined time M. Meanwhile, the predetermined time M is set for each rotation condition.

If it is determined in Step S55 that the elapsed time is not less than a predetermined time, the procedure proceeds to Step S56 and the angle threshold or the time threshold of the rotation condition X is decreased, that is, the rotation condition is eased.

If it is determined in Step S55 that the elapsed time is less than a predetermined time, the procedure proceeds to Step S57 and the angle threshold or the time threshold of the rotation condition X is increased, that is, the rotation condition is tightened.

If the yaw rotation is stopped in Step S53 and the rotation condition is eased or made tight in Step S56 or S57, the start of the rotation is determined in Step S54 while the eased or tightened rotation condition X' is used as a new rotation condition X. If the condition of the rotation start is satisfied, the procedure returns to Step S51 and the yaw rotation starts again.

Accordingly, since it may be possible to change the rotation condition in accordance with the wind situation, it may be possible to maintain the frequency of rotations above a certain degree and to optimize the performance of the wind turbine generator.

INDUSTRIAL APPLICABILITY

The invention may be used as a yaw control technique for a wind turbine generator that can suppress an increase in the number of yaw rotations and decrease magnitude of the wind direction deviation even though the wind direction changes gradually over a long time, and a yaw control technique that improves the efficiency of the wind turbine generator by performing yaw rotation at an appropriate timing through the early detection of transitional changes in the wind direction.

The invention claimed is:

1. A wind turbine generator comprising:
a nacelle in which a wind turbine rotor is mounted;
a rotating mechanism that performs yaw rotation of the nacelle;
a wind direction measuring means that measures a wind direction; and
a controller that controls the rotating mechanism,
characterized in that the controller calculates the wind direction deviation from the direction of the wind turbine rotor and the wind direction measured by the wind direction measuring means, and performs yaw rotation of the nacelle by the rotating mechanism when any one of the following conditions (1) and (2) is satisfied,
the conditions (1) and (2) include (1) a state where the absolute value of the wind direction deviation is not less than a first threshold (or a state where the absolute value of the wind direction deviation exceeds a first threshold) continues for a predetermined first duration, and (2) a state where the absolute value of the wind direction deviation is not less than a second threshold larger than the first threshold (or a state where the absolute value of the wind direction deviation exceeds a second threshold) continues for a second duration shorter than the first duration, and
assuming that the current time is denoted by $t_0$ and T denotes a predetermined value, the yaw rotation of the nacelle is stopped if the average of the wind direction between time $t_0-T$ and time $t_0$ corresponds to the direction of the wind turbine rotor.

2. A wind turbine generator comprising:
a nacelle in which a wind turbine rotor is mounted;
a rotating mechanism that performs yaw rotation of the nacelle;
a wind direction measuring means that measures a wind direction; and
a controller that controls the rotating mechanism,
characterized in that the controller calculates the wind direction deviation from the direction of the wind turbine rotor and the wind direction measured by the wind direction measuring means, and performs yaw rotation of the nacelle by the rotating mechanism when any one of the following conditions (1) and (2) is satisfied,
the conditions (1) and (2) include (1) a state where the absolute value of the wind direction deviation is not less than a first threshold (or a state where the absolute value of the wind direction deviation exceeds a first threshold) continues for a predetermined first duration, and (2) a state where the absolute value of the wind direction deviation is not less than a second threshold larger than the first threshold (or a state where the absolute value of the wind direction deviation exceeds a second threshold) continues for a second duration shorter than the first duration, and
the yaw rotation of the nacelle is performed by an angle, which corresponds to the first or second threshold corresponding to at least one of conditions (1) and (2) satisfied at the time of the yaw rotation.

3. The wind turbine generator according to claim 2,
characterized in that the controller rotates the nacelle by an angle corresponding to the first or second threshold, determines whether a sign of the wind direction deviation becomes opposite to a sign of the wind direction deviation before the yaw rotation, stops the yaw rotation if the sign of the wind direction deviation becomes opposite to the sign of the wind direction deviation before the yaw rotation, and continues the yaw rotation until the wind direction deviation becomes zero if the sign of the wind direction deviation does not become opposite to the sign of the wind direction deviation before the yaw rotation.

4. The wind turbine generator according to claim 2,
characterized in that the controller rotates the nacelle by an angle corresponding to the first or second threshold, determines whether a sign of the difference between the direction of the wind turbine rotor and the average of the wind direction between time $t_0-T$ and time $t_0$ becomes opposite to a sign of the difference before the yaw rotation assuming that the current time is denoted by $t_0$ and T denotes a predetermined value, stops the yaw rotation if the sign of the difference becomes opposite to the sign of the deviation before the yaw rotation, and continues the yaw rotation until the difference between the average of the wind direction and the direction of the wind turbine rotor becomes zero if the sign of the wind direction deviation does not become opposite to the sign of the wind direction deviation before the yaw rotation.

5. A wind turbine generator comprising:
a nacelle in which a wind turbine rotor is mounted;
a rotating mechanism that performs yaw rotation of the nacelle;

a wind direction measuring means that measures a wind direction; and a controller that controls the rotating mechanism, characterized in that the controller (a) calculates the deviation of the wind direction from the direction of the wind turbine rotor and the wind direction measured by the wind direction measuring means, (b) determines which situation of a first situation where the wind direction changes at random and a second situation where the wind direction gradually changes the current wind situation corresponds to, (c) determines that the current wind situation corresponds to the second situation, rotates the nacelle by an angle corresponding to a first threshold when a state where the absolute value of the wind direction deviation is not less than a predetermined first threshold (or a state where the absolute value of the wind direction deviation exceeds the first threshold) continues for a predetermined first duration, determines whether a sign of the wind direction deviation becomes opposite to a sign of the wind direction deviation before the yaw rotation, stops the yaw rotation if the sign of the wind direction deviation becomes opposite to the sign of the wind direction deviation before the yaw rotation, and continues the yaw rotation until the wind direction deviation becomes zero if the sign of the wind direction deviation does not become opposite to the sign of the wind direction deviation before the yaw rotation, and (d) determines that the current wind situation corresponds to the first situation, and performs yaw rotation of the nacelle so that an average of the wind direction between time $t_0-T$ and time $t_0$ corresponds to the direction of the wind turbine rotor assuming that the current time is denoted by $t_0$ and T denotes a predetermined value, when a state where the absolute value of the wind direction deviation is not less than a second threshold larger than the first threshold (or a state where the absolute value of the wind direction deviation exceeds a second threshold) continues for a second duration shorter than the first duration.

6. A wind turbine generator comprising:

a nacelle in which a wind turbine rotor is mounted;

a rotating mechanism that performs yaw rotation of the nacelle;

a wind direction measuring means that measures a wind direction; and a controller that controls the rotating mechanism, characterized in that the controller calculates the wind direction deviation from the direction of the wind turbine rotor and the wind direction measured by the wind direction measuring means, and performs yaw rotation of the nacelle when the wind direction deviation satisfies a predetermined condition about all of time t satisfying "$t_s \leq t \leq t_0$" assuming that the current time is denoted by $t_0$, $T_1$ denotes a predetermined value, and time satisfying "$t_0-T_1 \leq t_s \leq t_0$" is denoted by $t_s$, the predetermined condition is $|\Delta\theta(t)| \geq \theta_{TH}(t_s)$, ($|\Delta\theta(t)|$ denotes the absolute value of the wind direction deviation at each time t, $\theta_{TH}(t)$ denotes a function that broadly uniformly increases in the range of "$t_0-T_1 \leq t \leq t_0$", and a derived function $d\theta_{TH}(t)/dt$ of $\theta_{TH}(t)$ with respect to time broadly uniformly increases in the range of "$t_0-T_1 \leq t \leq t_0$" except for time t where a derived function cannot be defined).

7. A wind turbine generator comprising:

a nacelle in which a wind turbine rotor is mounted;

a rotating mechanism that performs yaw rotation of the nacelle;

a wind direction measuring means that measures a wind direction; and a controller that controls the rotating mechanism, characterized in that the controller (a) calculates the wind direction deviation from the direction of the wind turbine rotor and the wind direction measured by the wind direction measuring means, (b) determines which situation of a first situation where the wind direction changes at random and a second situation where the wind direction is gradually changed the current wind situation corresponds to, and (c) performs yaw rotation of the nacelle when the wind direction deviation satisfies a predetermined condition about all of time t satisfying "$t_s \leq t \leq t_0$" assuming that the current time is denoted by $t_0$, $T_1$ denotes a predetermined value, and time satisfying "$t_0-T_1 \leq t_s \leq t_0$" is denoted by $t_s$, and the predetermined condition is $|\Delta\theta(t)| \geq \theta_{TH1}(t_s)$ if the current wind situation corresponds to the first situation, and is $|\Delta\theta(t)| \geq \theta_{TH2}(t_s)$ if the current wind situation corresponds to the second situation, ($|\Delta\theta(t)|$ denotes the absolute value of the wind direction deviation at each time t, $\theta_{TH1}(t)$ denotes a function that broadly uniformly increases in the range of "$t_0-T_1 \leq t \leq t_0$", and a derived function $d\theta_{TH1}(t)/dt$ of $\theta_{TH1}(t)$ with respect to time broadly uniformly increases in the range of "$t_0-T_1 \leq t \leq t_0$" except for time t where a derived function cannot be defined, $\theta_{TH1}(t)$ denotes a function that broadly uniformly decreases in the range of "$t_0-T_1 \leq t \leq t_0$", and a derived function $d\theta_{TH1}(t)/dt$ of $\theta_{TH2}(t)$ with respect to time broadly uniformly increases in the range of "$t_0-T_1 \leq t \leq t_0$" except for time t where a derived function cannot be defined).

8. The wind turbine generator according to claim 6, characterized in that assuming that the current time is denoted by $t_0$ and T denotes a predetermined value, the controller stops the yaw rotation of the nacelle if an average of the wind direction between time $t_0-T$ and time $t_0$ corresponds to the direction of the wind turbine rotor.

9. The wind turbine generator according to claim 6, characterized in that the controller rotates the nacelle by an angle corresponding to $\theta_{TH1}(t_s)$ or $\theta_{TH2}(t_s)$, determines whether a sign of the wind direction deviation becomes opposite to a sign of the wind direction deviation before the yaw rotation, stops the yaw rotation if the sign of the wind direction deviation becomes opposite to the sign of the wind direction deviation before the yaw rotation, and continues the yaw rotation until the wind direction deviation becomes zero if the sign of the wind direction deviation does not become opposite to the sign of the wind direction deviation before the yaw rotation.

10. The wind turbine generator according to claim 1, characterized in that the controller measures the number of yaw rotations that is performed between the current time and a predetermined time, eases the rotation conditions if the number of yaw rotations is smaller than a predetermined number of rotations, and tightens the rotation conditions if the number of rotations is larger than a predetermined number of rotations.

11. A method of controlling a wind turbine generator including a nacelle in which a wind turbine rotor is mounted, the method of comprising:

measuring a wind direction;

calculating the wind direction deviation from the direction of the wind turbine rotor and the measured wind direction;

performing the yaw rotation of the nacelle when any one of the following conditions (1) and (2) is satisfied, the following conditions (1) and (2) including (1) a state where the absolute value of the wind direction deviation is not less than a first threshold (or a state where the absolute value of the wind direction deviation exceeds a first threshold) continues for a predetermined first duration, and (2) a state where the absolute value of the wind direction deviation is not less than a second threshold larger than the first threshold (or a state where the absolute value of the wind direction deviation exceeds a second threshold) continues for a second duration shorter than the first duration; and stopping the yaw rotation of the nacelle if an average of the wind direction between time $t_0-T$ and time $t_0$ corresponds to the direction of the wind turbine rotor assuming that the current time is denoted by $t_0$ and T denotes a predetermined value.

12. A method of controlling a wind turbine generator including a nacelle in which a wind turbine rotor is mounted, the method of comprising:

measuring a wind direction;

calculating the wind direction deviation from the direction of the wind turbine rotor and the measured wind direction; and performing the yaw rotation of the nacelle by an angle, which corresponds to the first or second threshold corresponding to at least one satisfied condition of the conditions (1) and (2), when any one of the following conditions (1) and (2) is satisfied, the following conditions (1) and (2) including (1) a state where the absolute value of the wind direction deviation is not less than a first threshold (or a state where the absolute value of the wind direction deviation exceeds a first threshold) continues for a predetermined first duration, and (2) a state where the absolute value of the wind direction deviation is not less than a second threshold larger than the first threshold (or a state where the absolute value of the wind direction deviation exceeds a second threshold) continues for a second duration shorter than the first duration.

13. A method of controlling a wind turbine generator including a nacelle in which a wind turbine rotor is mounted, the method of comprising:

measuring a wind direction;

calculating the wind direction deviation from the direction of the wind turbine rotor and the measured wind direction; and performing the yaw rotation of the nacelle when the wind direction deviation satisfies a predetermined condition about all of time t satisfying "$t_s \leq t \leq t_0$" assuming that the current time is denoted by $t_0$, $T_1$ denotes a predetermined value, and time satisfying "$t_0-T_1 \leq t_s \leq t_0$" is denoted by $t_s$, characterized in that the predetermined condition is $|\Delta\theta(t)| \geq \theta_{TH}(t_s)$ $|\Delta\theta(t)|$ denotes the absolute value of the wind direction deviation at each time t, $\theta_{TH}(t)$ denotes a function that broadly uniformly increases in the range of "$t_0-T_1 \leq t \leq t_0$", and a derived function $d\theta_{TH}(t)/dt$ of $\theta_{TH}(t)$ with respect to time broadly uniformly increases in the range of "$t_0-T_1 \leq t \leq t_0$" except for time t where a derived function cannot be defined.

* * * * *